United States Patent
Liu et al.

(10) Patent No.: US 10,320,730 B2
(45) Date of Patent: Jun. 11, 2019

(54) METHOD AND DEVICE FOR DISPLAYING MESSAGE

(71) Applicant: Xiaomi Inc., Beijing (CN)

(72) Inventors: Daokuan Liu, Beijing (CN); Xu Zhang, Beijing (CN); Bin Wang, Beijing (CN); Haibin Weng, Beijing (CN)

(73) Assignee: Xiaomi Inc., Beijing (CN)

( * ) Notice: Subject to any disclaimer, the term of this patent is extended or adjusted under 35 U.S.C. 154(b) by 945 days.

(21) Appl. No.: 14/460,572

(22) Filed: Aug. 15, 2014

(65) Prior Publication Data

US 2015/0074209 A1    Mar. 12, 2015

Related U.S. Application Data

(63) Continuation of application No. PCT/CN2014/077001, filed on May 8, 2014.

(30) Foreign Application Priority Data

Sep. 10, 2013   (CN) .......................... 2013 1 0409726

(51) Int. Cl.
  *G06F 3/01*       (2006.01)
  *H04L 12/58*      (2006.01)
  *H04M 1/725*      (2006.01)
  *G06F 3/0488*     (2013.01)

(52) U.S. Cl.
  CPC .............. *H04L 51/18* (2013.01); *G06F 3/017* (2013.01); *G06F 3/0488* (2013.01); *H04L 51/22* (2013.01); *H04M 1/72552* (2013.01); *H04L 51/16* (2013.01); *H04M 2250/22* (2013.01)

(58) Field of Classification Search
  CPC ..... G06F 3/04883; G06F 3/017; H04L 51/00; H04L 51/16; H04L 51/22; H04L 51/18
  See application file for complete search history.

(56) References Cited

U.S. PATENT DOCUMENTS

| | | | |
|---|---|---|---|
| 5,870,548 A * | 2/1999 | Nielsen | G06Q 10/107 379/93.24 |
| 9,654,426 B2 * | 5/2017 | Underwood, IV | H04L 51/00 |
| 2008/0219416 A1 | 9/2008 | Roujinsky | |
| 2009/0172399 A1 | 7/2009 | Schmid | |

(Continued)

FOREIGN PATENT DOCUMENTS

| | | |
|---|---|---|
| CN | 1578278 A | 2/2005 |
| CN | 101090409 | 12/2007 |

(Continued)

OTHER PUBLICATIONS

International Search Report of PCT/CN2014/077001, mailed from the State Intellectual Property Office of China dated Jul. 29, 2014.

(Continued)

*Primary Examiner* — Aaron N Strange
(74) *Attorney, Agent, or Firm* — Finnegan, Henderson, Farabow, Garrett & Dunner LLP

(57) ABSTRACT

A method for a device to display a message includes receiving a message marking instruction directed to a message in a message display window; processing the message according to the message marking instruction; and updating the message display window with the processed message.

18 Claims, 30 Drawing Sheets

(56) References Cited

U.S. PATENT DOCUMENTS

| | | | |
|---|---|---|---|
| 2009/0193348 A1 | 7/2009 | Banks et al. | |
| 2010/0048241 A1 | 2/2010 | Seguin et al. | |
| 2010/0226806 A1 | 9/2010 | Mellet et al. | |
| 2010/0325470 A1 | 12/2010 | Underwood et al. | |
| 2011/0304556 A1 | 12/2011 | Harris et al. | |
| 2012/0223889 A1* | 9/2012 | Medlock | G06F 3/04883 345/168 |
| 2012/0231770 A1 | 9/2012 | Clarke et al. | |
| 2012/0317499 A1 | 12/2012 | Shen | |
| 2013/0116007 A1 | 5/2013 | Seguin et al. | |
| 2013/0159878 A1 | 6/2013 | Kim et al. | |
| 2014/0059448 A1* | 2/2014 | Lee | H04L 51/066 715/752 |
| 2014/0143738 A1* | 5/2014 | Underwood, IV | H04L 51/38 715/863 |
| 2014/0171153 A1* | 6/2014 | Kienzle | G06F 3/0237 455/566 |
| 2014/0267094 A1* | 9/2014 | Hwang | G06F 3/04883 345/173 |

FOREIGN PATENT DOCUMENTS

| | | |
|---|---|---|
| CN | 101526681 A | 9/2009 |
| CN | 101539840 | 9/2009 |
| CN | 102187303 A | 9/2011 |
| CN | 102262506 | 11/2011 |
| CN | 102523565 | 6/2012 |
| CN | 102855074 | 1/2013 |
| CN | 103472995 | 12/2013 |
| CN | 103577042 | 2/2014 |
| JP | 2003-058318 | 2/2003 |
| JP | 2005352772 | 12/2005 |
| JP | 2009104268 | 5/2009 |
| JP | 5224623 | 7/2013 |
| KR | 10-2005-0004079 | 6/2012 |
| KR | 101610569 | 4/2016 |
| RU | 2459240 C2 | 8/2012 |
| RU | 2010140041 A | 8/2012 |
| WO | WO2010/002354 A1 | 1/2010 |
| WO | WO 2010/071630 A1 | 6/2010 |

OTHER PUBLICATIONS

Search Report for European Application No. 14184135.3, from the European Patent Office, dated Jan. 30, 2015 (6 pages).
English translation of International Search Report of PCT/CN2014/077001, from the State Intellectual Property Office of China, dated Jul. 29, 2014.

* cited by examiner

METHOD AND DEVICE FOR DISPLAYING MESSAGE

CROSS REFERENCE TO RELATED APPLICATION

This application is a continuation of International Application No. PCT/CN2014/077001, filed May 8, 2014, which is based upon and claims priority from Chinese Patent Application No. 201310409726.6, filed Sep. 10, 2013, the entire contents of all of which are incorporated herein by reference.

TECHNICAL FIELD

The present disclosure generally relates to the field of computer and communication technology and, more particularly, to a method and a device for displaying a message.

BACKGROUND

A user may use a communication application installed on a device to communicate with another user through messages in the form of text, audio, or video. Generally, conversations, including received messages and messages that are sent out, are displayed in a message display window of the device for the user to browse.

Conventionally, when the user finds that there is an error in a message sent out previously, the user may send another message to explain about the error and then send out a message with correct content. Thus, the receiving user will receive the erroneous message, the explanation message, and the correct message. The receiving user may need to read the three received messages to understand what the sending user means, which may cause inconvenience to the receiving user.

SUMMARY

According to a first aspect of the present disclosure, there is provided a method for a device to display a message, comprising: receiving a message marking instruction directed to a message in a message display window; processing the message according to the message marking instruction; and updating the message display window with the processed message.

According to a second aspect of the present disclosure, there is provided a device, comprising: a processor; and a memory for storing instructions executable by the processor; wherein the processor is configured to: receive a message marking instruction directed to a message in a message display window; process the message according to the message marking instruction; and update the message display window with the processed message.

According to a third aspect of the present disclosure, there is provided a non-transitory computer-readable storage medium including instructions that, when executed by a processor of a device, cause the device to perform a method for displaying a message, the method comprising: receiving a message marking instruction directed to a message in a message display window; processing the message according to the message marking instruction; and updating the message display window with the processed message.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
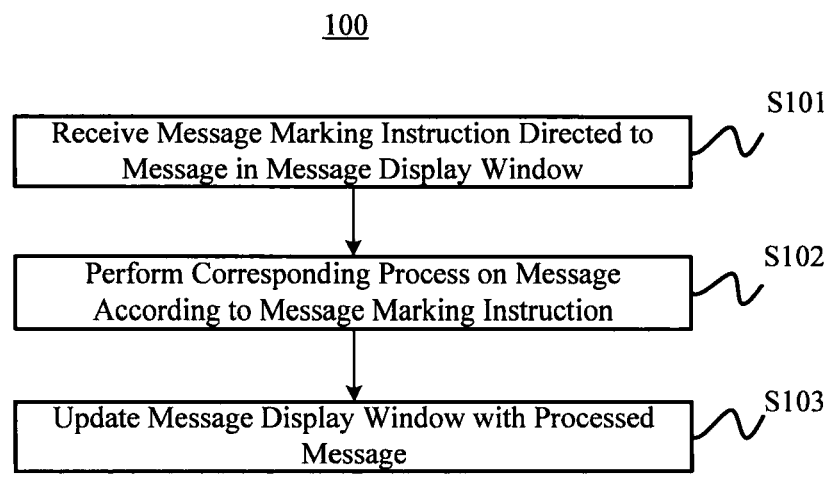
FIG. 1 is a flowchart of a method for displaying a message, according to an exemplary embodiment.

FIG. 1 is a flowchart of a method 100 for a device to display a message, according to an exemplary embodiment. For example, the device may be a mobile phone, a computer, a tablet computer, etc., and may be used in communication. Referring to FIG. 1, the method 100 includes the following steps.

In step S101, the device receives a message marking instruction directed to a message in a message display window. For example, the message marking instruction can be a message deleting instruction and a message referring instruction. Also for example, the message deleting instruction can be a whole message deleting instruction for deleting the whole message or a partial message deleting instruction for deleting a part of the message.

In exemplary embodiments, the device determines whether the message marking instruction is received by detecting a preset operation performed on the message in the message display window. For example, when the preset operation is detected being performed on the message in the message display window, the device determines the preset operation as the received message marking instruction directed to the message in the message display window, and operates according to the received message marking instruction. In one exemplary embodiment, the message marking instruction is received from another other device. Whether the message marking instruction is received from the device itself or from another device, the device can operate according to the received message marking instruction directed to the message in the message display window.

In step S102, the device performs a corresponding process on the message according to the message marking instruction. For example, the corresponding process according to the message deleting instruction can be deleting the whole message or a part of the message, or marking a deleting line across the message. Also for example, the corresponding process according to a message referring instruction includes displaying a reference mark between the message and a new message.

In step S103, the device updates the message display window with the processed message.

In the above embodiments, by performing the corresponding process on the message in the message display window according to the message marking instruction and updating the message in the message display window with the processed message, additional functions may be provided for a user. For example, through the method 100, when the user has sent out an erroneous message, the user does not need to explain the erroneous message, but marks the erroneous message, which improves the speed and efficiency for communication between users.

In exemplary embodiments, the device detects the preset operation on the message, and sends the message marking instruction to one or more other devices, so as to perform the message marking instruction in the message display windows of the respective devices. Accordingly, content is displayed synchronously in the message display windows of the respective devices.

Figure 2:
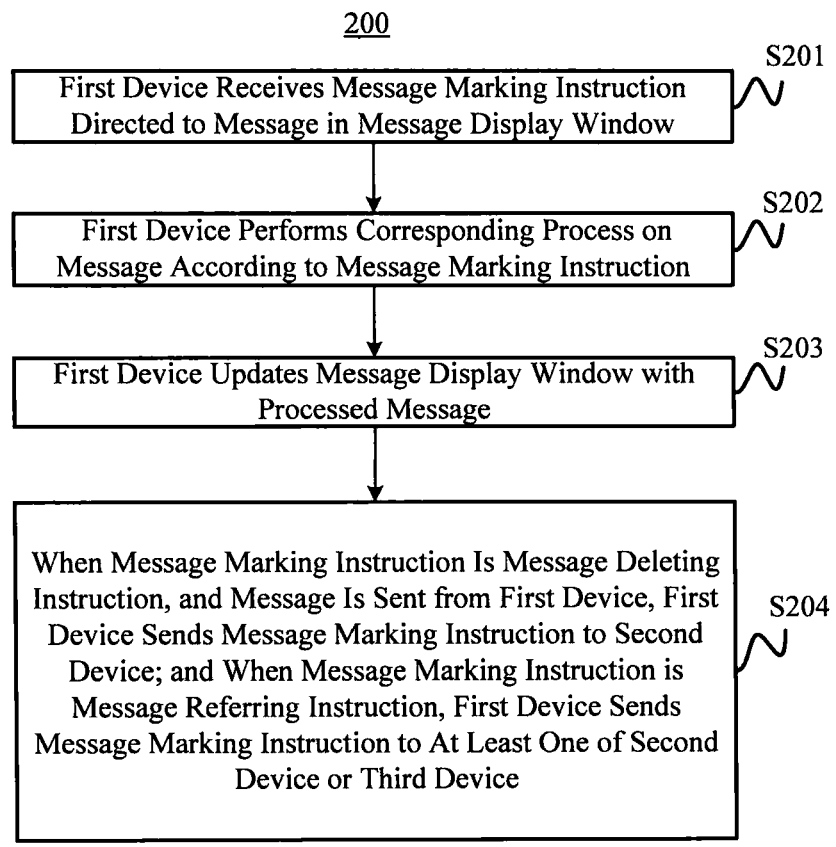
FIG. 2 is a flowchart of a method for determining a message marking instruction based on a preset operation, according to an exemplary embodiment.

FIG. 2 is a flowchart of a method 200 for determining a message marking instruction based on a preset operation, according to an exemplary embodiment. Referring to FIG. 2, the method 200 includes the following steps.

In step S201, a first device receives a message marking instruction directed to a message in a message display window.

In step S202, the first device performs a corresponding process on the message according to the message marking instruction.

In step S203, the first device updates the message display window with the processed message.

In step S204, when the message marking instruction is a message deleting instruction, and the message is a message sent from the first device, the first device sends the message marking instruction to a second device receiving the message; and when the message marking instruction is a message referring instruction to display a reference mark between the message and a new message, the first device sends the message marking instruction to at least one of the second device receiving the message or a third device from which the first device receives the message.

In one exemplary embodiment, the first device sends the message to one or more other devices, such as the second device, and initiates the message referring instruction directed to the message, the first device sends the message referring instruction to the one or more other devices receiving the message. In one exemplary embodiment, the first device receives the message from the third device and initiates the message referring instruction directed to the message, the first device sends the message referring instruction to one or more other devices that also receive the message, such as in a group chat, and to the third device sending the message.

In the above embodiments, by the first device sending the message marking instruction to the second device receiving the message, marking the message may be displayed simultaneously in the message display windows of the first device and the second device, which facilitates communication between users.

Figure 3:
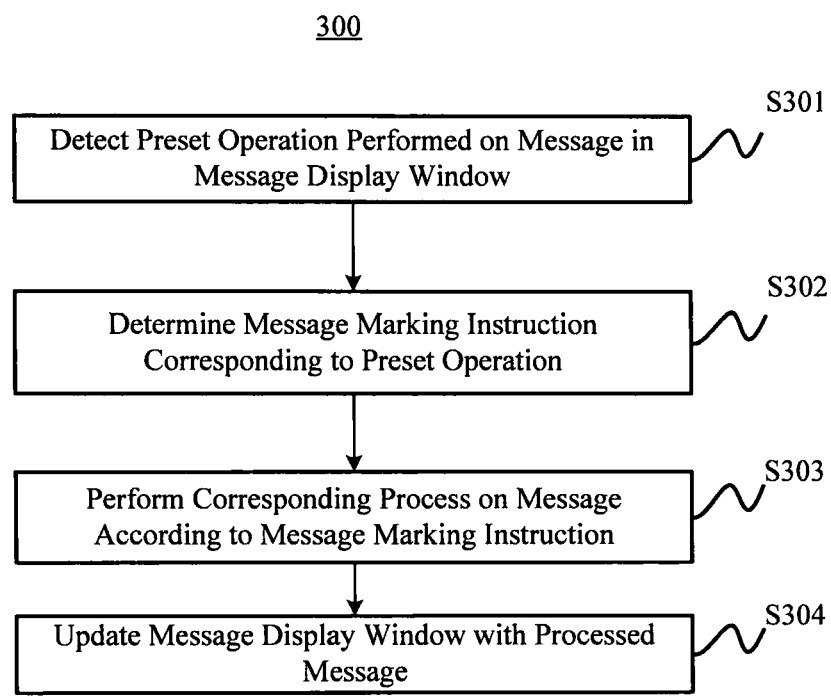
FIG. 3 is a flowchart of a method for displaying a message, according to an exemplary embodiment.

In exemplary embodiments, the device determines whether the message marking instruction is received by detecting a preset operation performed on the message in the message display window. FIG. 3 is a flowchart of a method 300 for a device to display a message, according to an exemplary embodiment. Referring to FIG. 3, the method 300 includes the following steps.

In step S301, the device detects a preset operation performed on a message in a message display window. The preset operation may be, for example, a preset gesture operation performed on the message, such as a rightward sliding with one finger, a leftward sliding with multiple fingers, a rightward sliding with multiple fingers, an upward sliding with one finger, a downward sliding with one finger, an upward sliding with multiple fingers, a downward sliding with multiple fingers, a click with one finger, a click with multiple fingers, a press with one finger, a press with multiple fingers, etc. In addition, other preset operations performed on the message may be detected, for example, any gesture that may be sensed by sensors without necessity to contact a touch screen, or a long press on a key to drag, a single click, double clicks, etc., that may be performed on the message by a mouse.

In step S302, the device determines a message marking instruction corresponding to the preset operation, according to the preset operation that is performed on the message in the message display window.

In one exemplary embodiment, the device determines the message marking instruction corresponding to the preset operation by looking up a pre-stored table. For example, Table 1 below shows an exemplary corresponding relationship between preset gesture operations and message marking instructions, in which one message marking instruction may correspond to a plurality of preset operations to improve operation convenience.

TABLE 1

| Preset Gesture Operation | Message Marking Instruction |
| --- | --- |
| Rightward Sliding with One Finger | Message Deleting Instruction |
| Leftward Sliding with One Finger | Message Deleting Instruction |
| Click with One Finger | Message Referring Instruction |
| Upward Sliding with One Finger | Message Referring Instruction |
| Downward Sliding with One Finger | Message Referring Instruction |

Also for example, Table 2 below shows an exemplary corresponding relationship between preset mouse operations and message marking instructions, in which one message marking instruction may correspond to a plurality of preset mouse operations to improve operation convenience.

TABLE 2

| Preset Mouse Operation | Message Marking Instruction |
| --- | --- |
| Leftward Dragging with Mouse | Message Deleting Instruction |
| Rightward Dragging with Mouse | Message Deleting Instruction |
| Upward Dragging with Mouse | Message Referring Instruction |
| Downward Dragging with Mouse | Message Referring Instruction |

Table 1 and Table 2 serve merely to illustrate exemplary corresponding relationships between the preset operations and the message marking instructions by examples, and not to limit the embodiment of the present disclosure.

In step S303, the device performs a corresponding process on the message according to the message marking instruction. For example, when a rightward sliding on the message is detected, the device determines to perform a message deleting instruction on the message, and the corresponding process is, for example, adding a deleting line across the message.

In step S304, the device updates the message display window with the processed message.

In the above embodiment, by detecting the preset operation performed on the message in the message display window, the message marking instruction corresponding to the preset operation may be determined. Communication between users is simplified to improve user experience.

Figure 4:
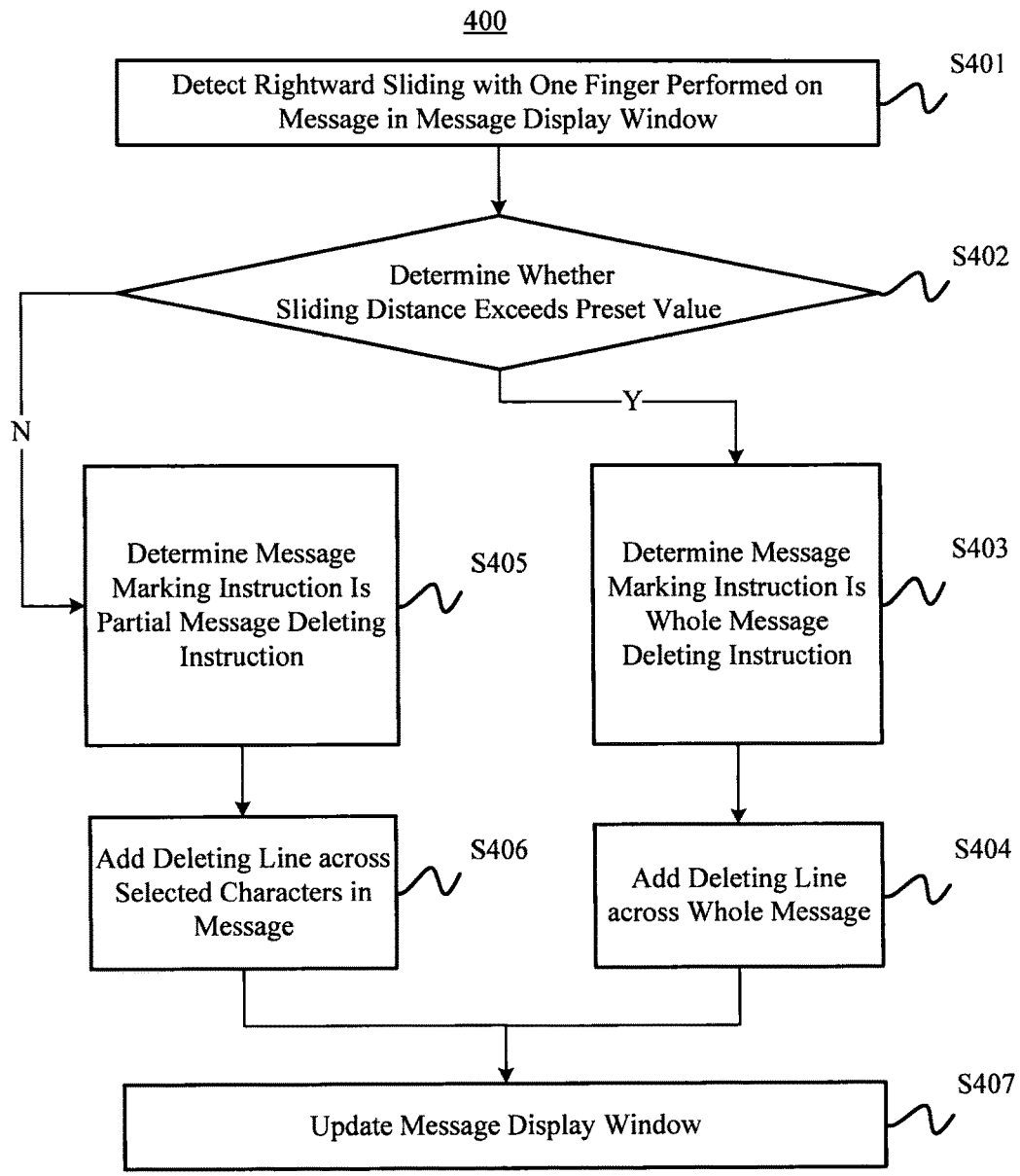
FIG. 4 is a flowchart of a method for displaying a message, according to an exemplary embodiment.

FIG. 4 is a flowchart of a method 400 for a device to display a message, according to an exemplary embodiment. Referring to FIG. 4, the method 400 includes the following steps.

In step S401, the device detects a rightward sliding with one finger performed on a message in a message display window. For example, a track of the rightward sliding is displayed to facilitate the user's check.

In step S402, the device determines whether a sliding distance of the rightward sliding exceeds a preset value. If it is determined that the sliding distance exceeds the preset value, the device performs step S403; otherwise, the device performs step S405. For example, the device can determine whether the rightward sliding is performed on the whole message or a part of the message according to the sliding distance.

In one exemplary embodiment, the device determines whether the rightward sliding with one finger is performed on the whole message or a part of the message by determining a start point and a finish point of the rightward sliding. If the start point and the finish point are located at a start position and an end position of the message, respectively, the device determines that the rightward sliding corresponds to the whole message deleting instruction If the starting point is not located at the start position of the message, or the finish point is not located at the end position of the message, the device determines that the rightward sliding corresponds to the partial message deleting instruction.

In step S403, the device determines that the message marking instruction corresponding to the rightward sliding is the whole message deleting instruction.

Figure 5:
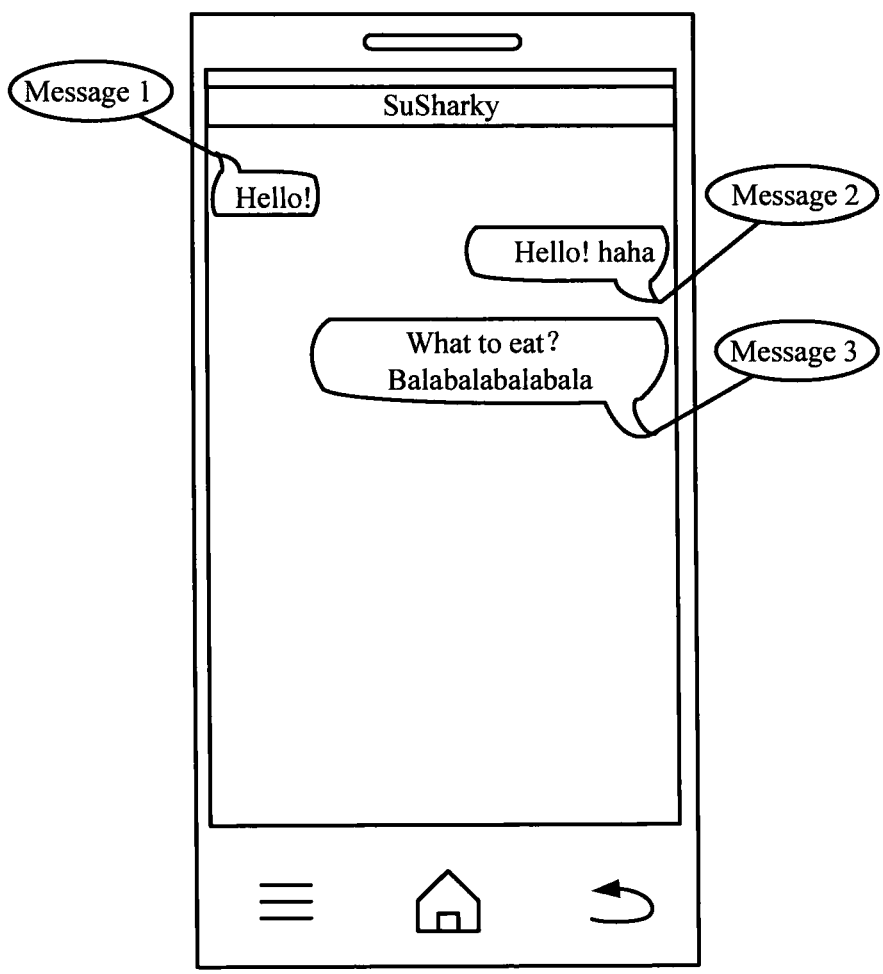
FIG. 5 is a schematic view of a message display window, according to an exemplary embodiment.
Figure 6:
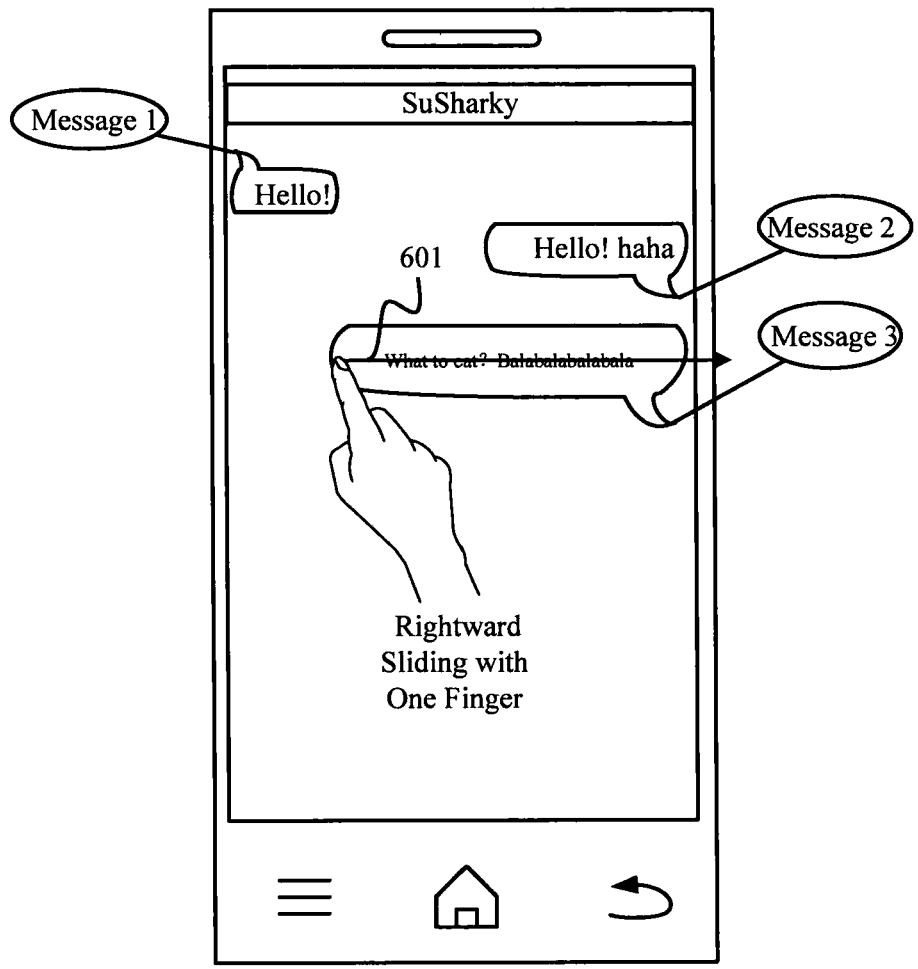
FIG. 6 is a schematic view of a rightward sliding with one finger performed on a message, according to an exemplary embodiment.

For example, FIG. 5 is a schematic view of the message display window displaying three messages Message 1, Message 2, and Message 3. FIG. 6 is a schematic view of a rightward sliding with one finger, represented by an arrowed line 601, performed on the whole Message 3, in which the rightward sliding is performed along a direction of the arrowed line 601, and corresponds the whole message deleting instruction.

Referring back to FIG. 4, in step S404, the device adds a deleting line across the message.

In step S405, if it is determined that the sliding distance does not exceed the preset value, the device determines that the message marking instruction corresponding to the rightward sliding is the partial message deleting instruction.

Figure 7:
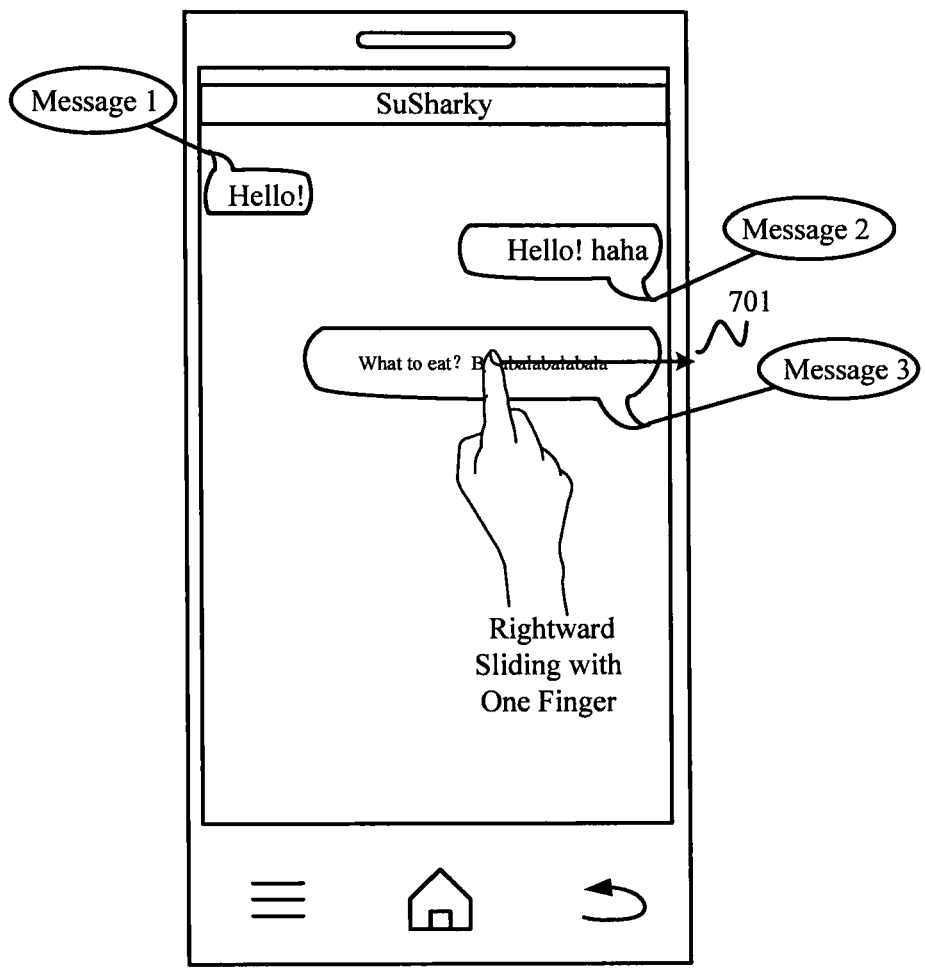
FIG. 7 is a schematic view of a rightward sliding with one finger performed on a part of a message, according to an exemplary embodiment.

For example, FIG. 7 is a schematic view of a rightward sliding with one finger, represented by an arrowed line 701, performed on a part of the message, such as some characters of Message 3. Accordingly, the device determines that the rightward sliding corresponds to the partial message deleting instruction.

In step S406, the device adds a deleting line across the selected characters in the message that are passed by the rightward sliding.

In step S407, the device updates the message display window with the message on which the deleting line is added.

Figure 8:
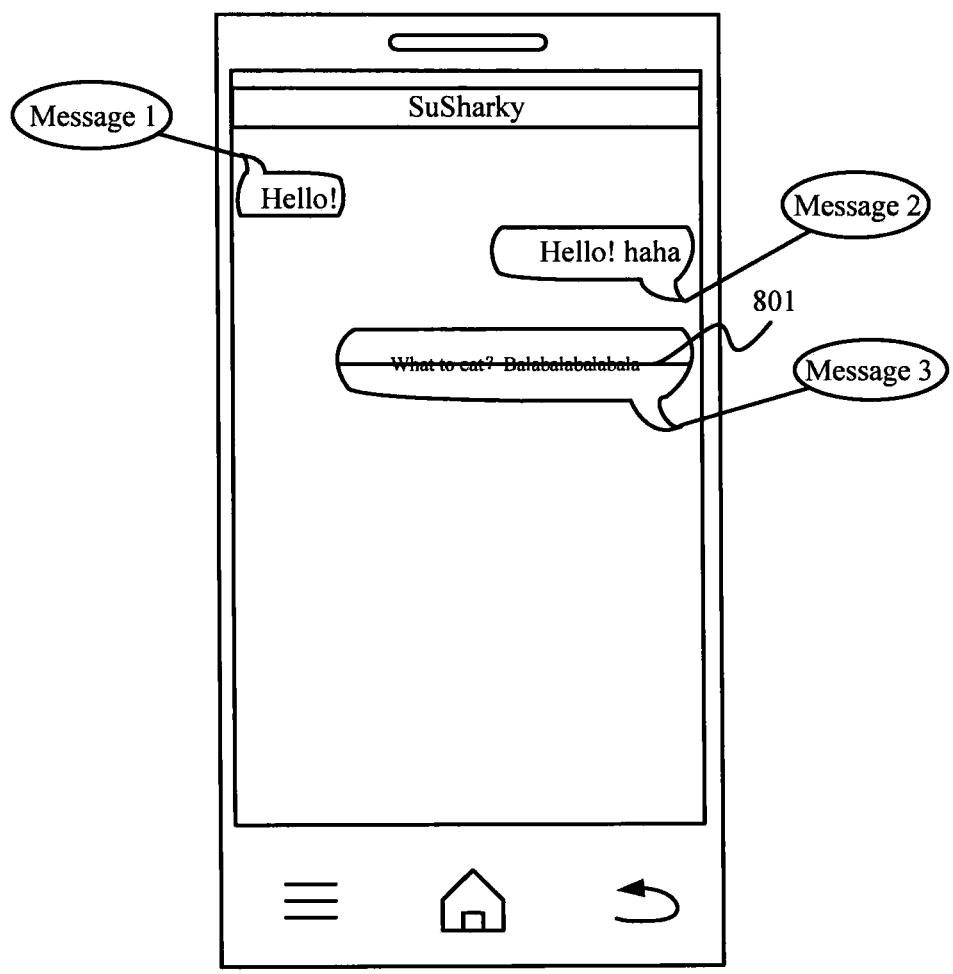
FIG. 8 is a schematic view of a message display window, according to an exemplary embodiment.

For example, FIG. 8 is a schematic view of the message display window displaying a deleting line 801 being added on the whole Message 3 after the rightward sliding with one finger is performed on the whole Message 3, as shown in FIG. 6.

Figure 9:
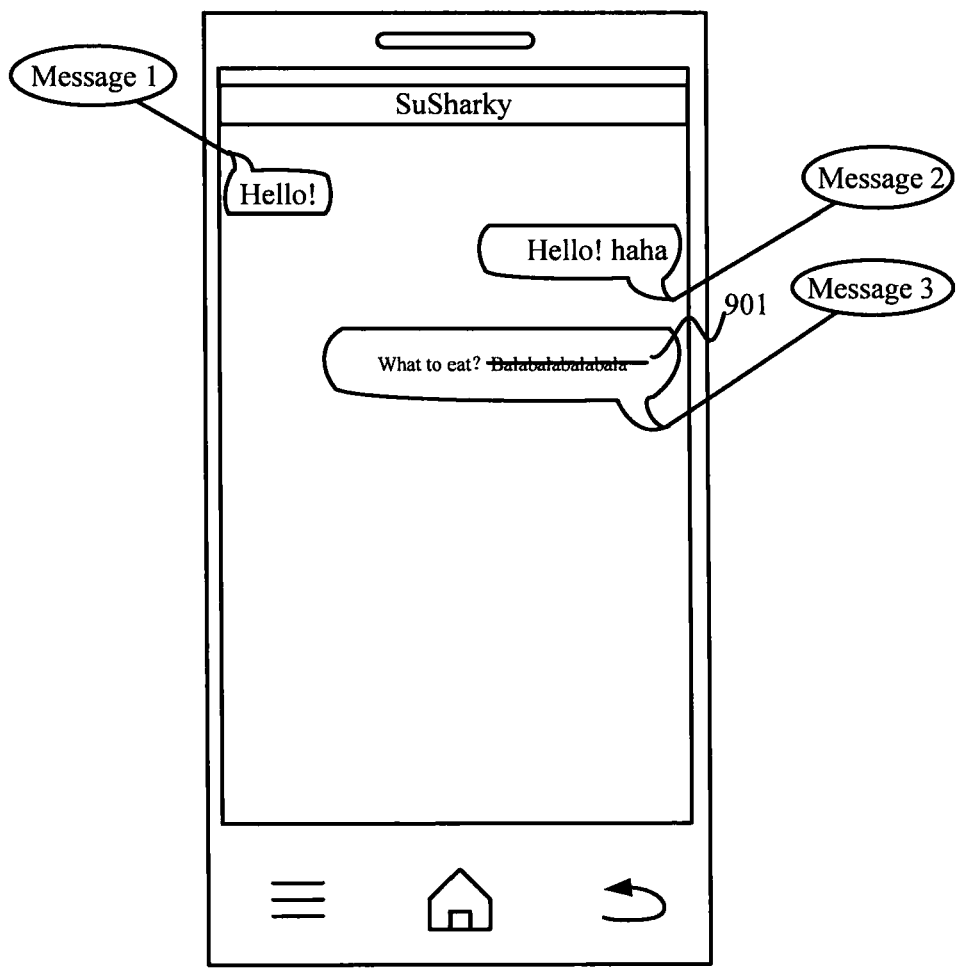
FIG. 9 is a schematic view of a message display window, according to an exemplary embodiment.

Also for example, FIG. 9 is a schematic view of the message display window displaying a deleting line 901 being added on a part of Message 3, i.e., on the selected characters of Message 3 on which the rightward sliding with one finger is performed, as shown in FIG. 7.

In the above embodiment, by adding a deleting line on the message in the message display window to indicate, e.g., that the message is erroneous, the erroneous message is shown by the deleting line. The manner of displaying an erroneous message is made simple and the user generally can understand the meaning of the deleting line. Adding a deleting line on the erroneous message may save an effort of the user to explain the error and, thus, the operation of the user is simplified.

Figure 10:
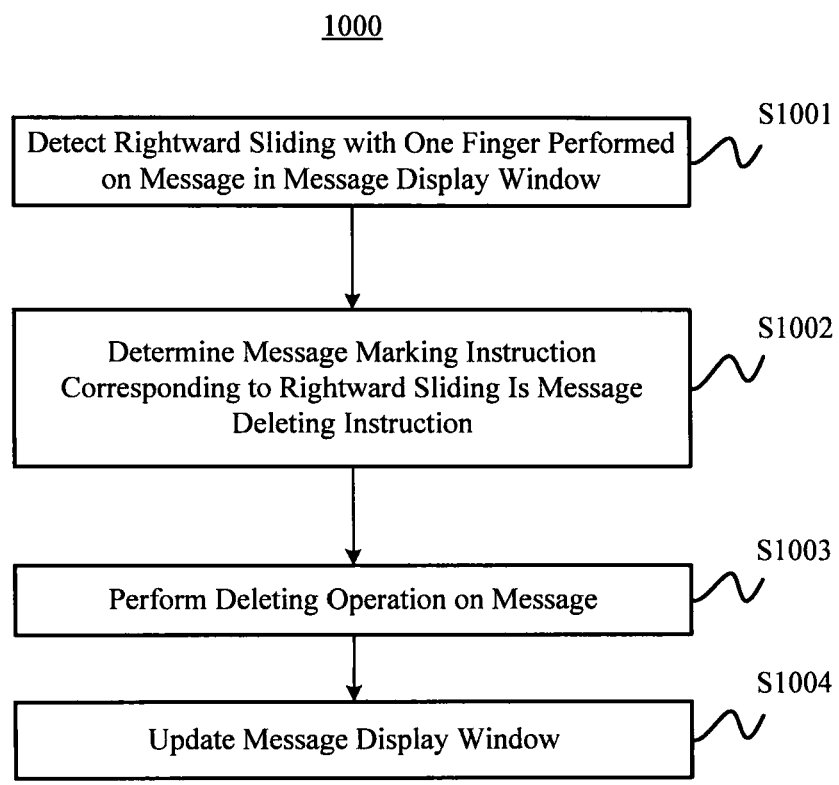
FIG. 10 is a flowchart of a method for displaying a message after a deleting operation, according to an exemplary embodiment.

FIG. 10 is a flowchart of a method 1000 for a device to display a message after a deleting operation, according to an exemplary embodiment. Referring to FIG. 10, the method 1000 includes the following steps.

In step S1001, the device detects a rightward sliding with one finger performed on a message in a message display window.

In step S1002, the device determines that a message marking instruction corresponding to the rightward sliding is a message deleting instruction, according to the detected rightward sliding. For example, the message deleting instruction can be a whole message deleting instruction for deleting the whole message or a partial message deleting instruction for deleting a part of the message. When the whole message deleting instruction is received, the whole message is deleted. When the partial message deleting instruction is received, a selected part of the message is deleted.

In one exemplary embodiment, as shown in FIG. 6, the rightward sliding with one finger performed on the whole message corresponds to the whole message deleting instruction.

In one exemplary embodiment, as shown in FIG. 7, the rightward sliding with one finger performed on part of the message corresponds to the partial message deleting instruction.

Referring back to FIG. 10, in step S1003, the device performs a deleting operation on the message.

In step S1004, the device updates the message display window.

Figure 11:
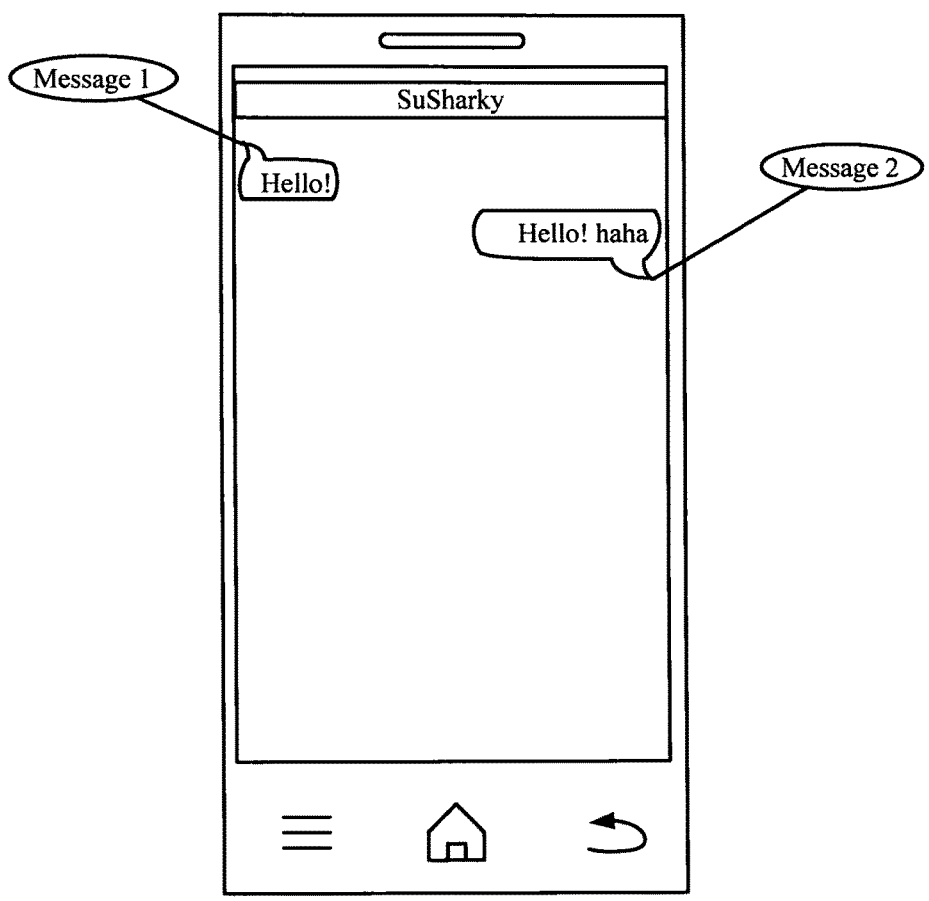
FIG. 11 is a schematic view of a message display window, according to an exemplary embodiment.

For example, FIG. 11 is a schematic view of the message display window in which, after the rightward sliding with one finger performed on the whole Message 3 is detected (FIG. 6), the whole Message 3 is deleted, with the whole Message 3 not being displayed in the message display window.

Figure 12:
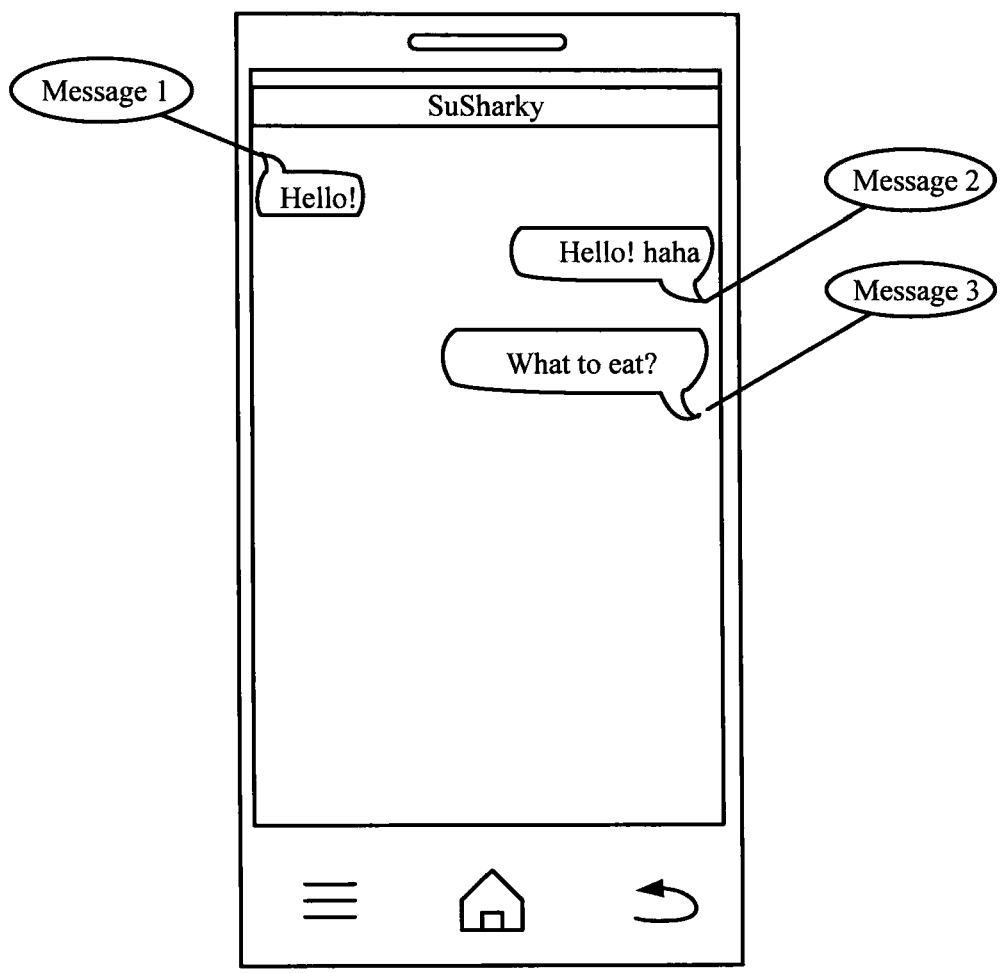
FIG. 12 is a schematic view of a message display window, according to an exemplary embodiment.

Also for example, FIG. 12 is a schematic view of the message display window in which, after the rightward sliding with one finger performed on a part of Message 3 is detected (FIG. 7), selected characters of Message 3 are deleted, with the selected characters of Message 3 not being displayed and the undeleted part of Message 3 being displayed in the message display window.

Figure 13:
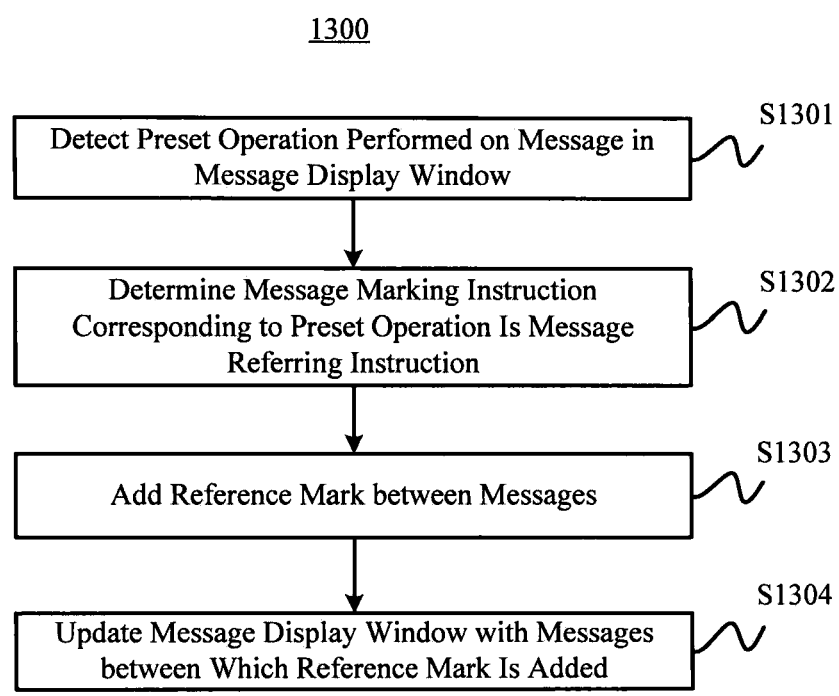
FIG. 13 is a flowchart of a method for displaying a message, according to an exemplary embodiment.

In exemplary embodiments, a reference mark may also be displayed on a device by performing a message referring instruction to display a correlation between messages in the message display window through the reference mark, for the user to understand content of the messages. FIG. 13 is a flowchart of a method 1300 for displaying a message when the message marking instruction is received, according to an exemplary embodiment. Referring to FIG. 13, the method 1300 includes the following steps.

In step S1301, the device detects a preset operation performed on a message in a message display window. The preset operation is, for example, a long press on the message.

Figure 14:
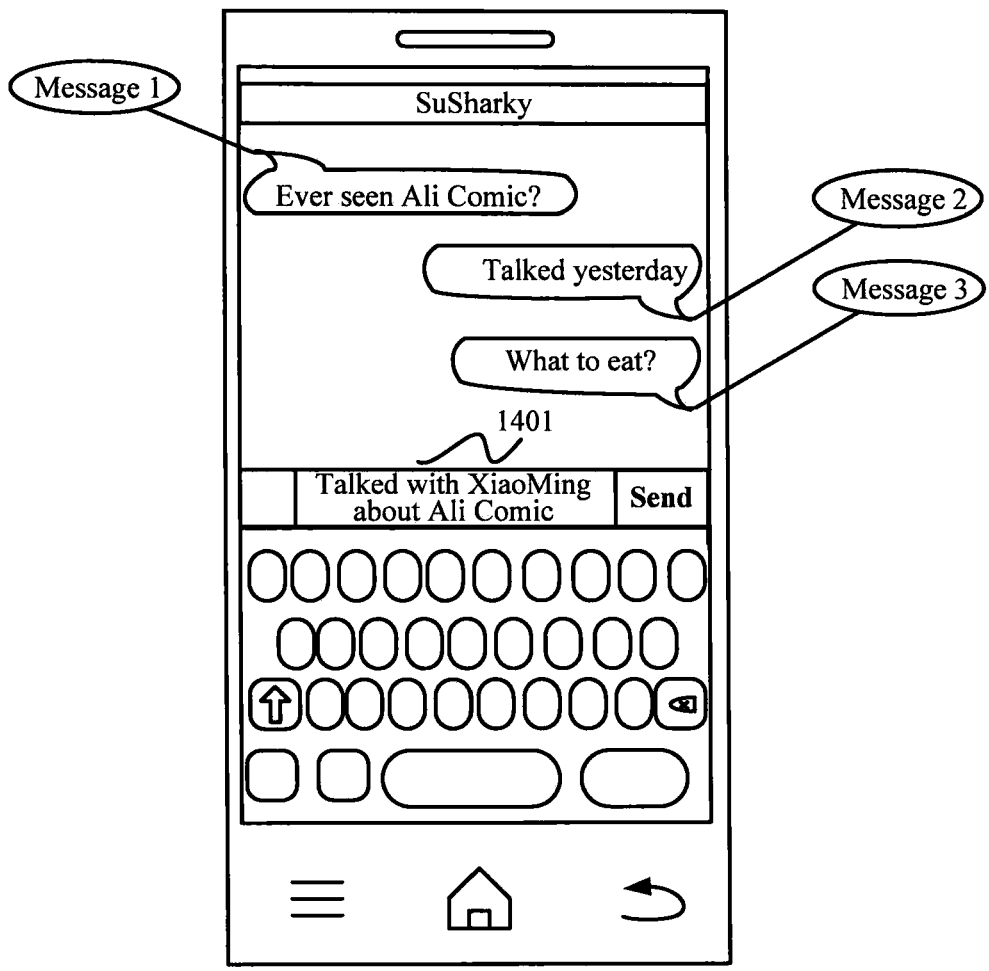
FIG. 14 is a schematic view of a message display window, according to an exemplary embodiment.

For example, FIG. 14 is a schematic view of the message display window displaying three messages, Message 1, Message 2, and Message 3. In addition, a new message to be sent is being edited in an edit region 1401. When the long press operation performed on the Message 2 is detected, it is determined that the message referring instruction performed on Message 2 is received, which indicates that the new message refers to Message 2.

Referring back to FIG. 13, in step S1302, the device determines that the message marking instruction corresponding to the preset operation is the message referring instruction.

In step S1303, the device adds a reference mark between the message and another message that refers to the message. For example, in the above embodiment in FIG. 14, the new message refers to Message 2. Thus, the reference mark is added between Message 2 and the new message.

In step S1304, the device updates the message display window with the messages between which the reference mark is added.

Figure 15:
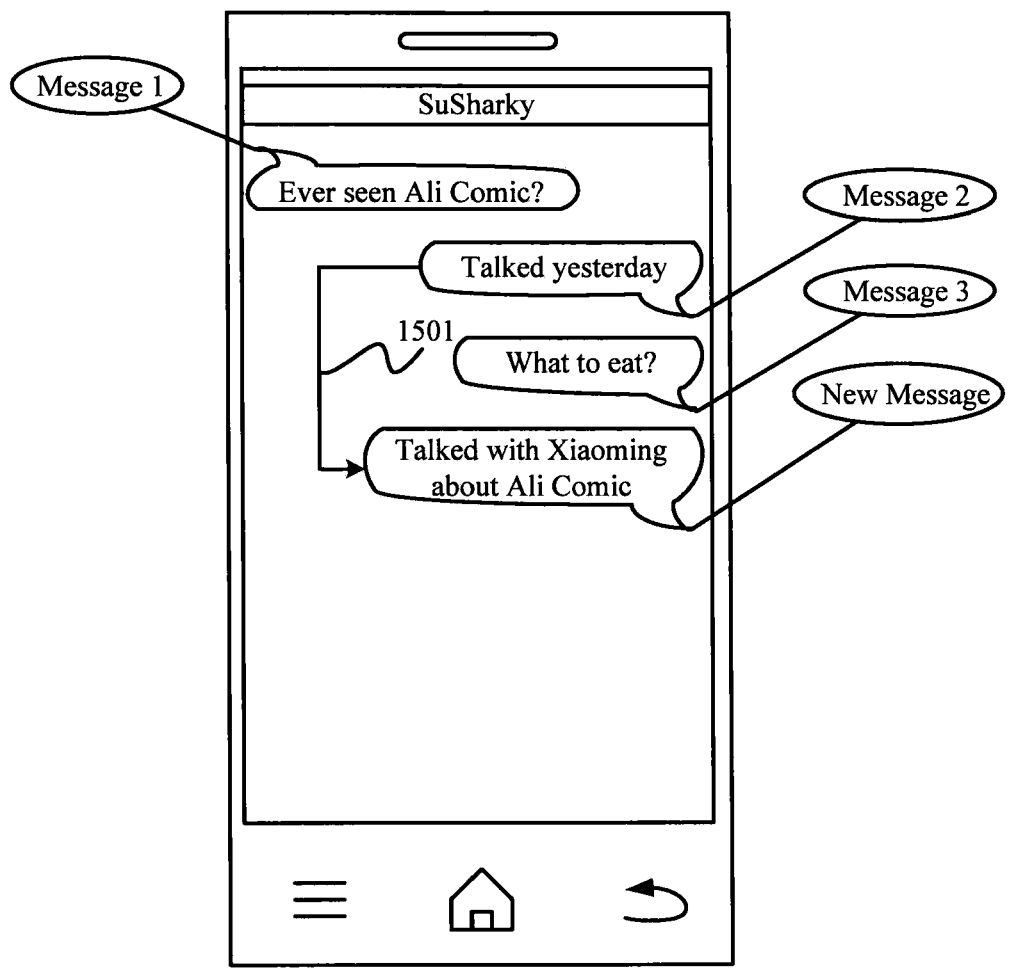
FIG. 15 is a schematic view of a message display window, according to an exemplary embodiment.

For example, FIG. 15 is a schematic view of the message display window displaying, after the long press operation on Message 2 is detected and the new message in the edit region has been sent out (FIG. 14), a reference mark 1501 added between Message 2 and the new message in the message display window.

Figure 16:
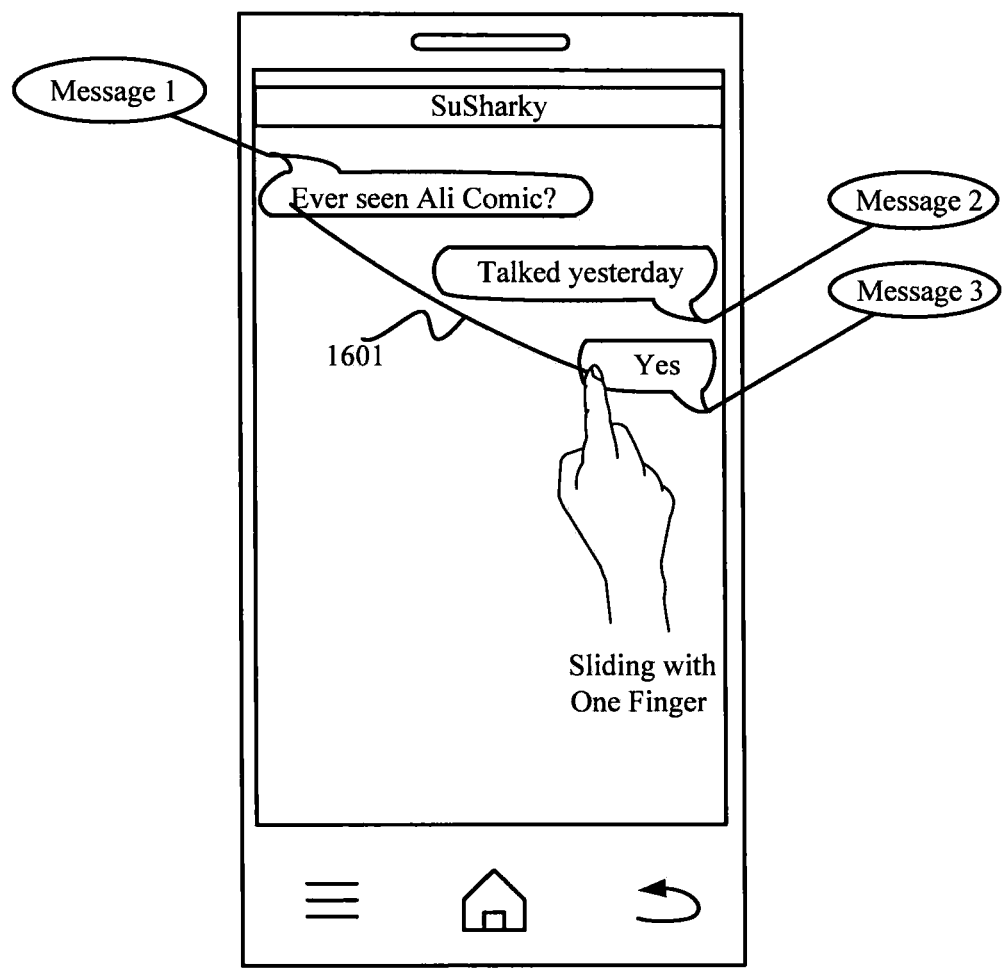
FIG. 16 is a schematic view of a sliding operation performed between messages, according to an exemplary embodiment.
Figure 17:
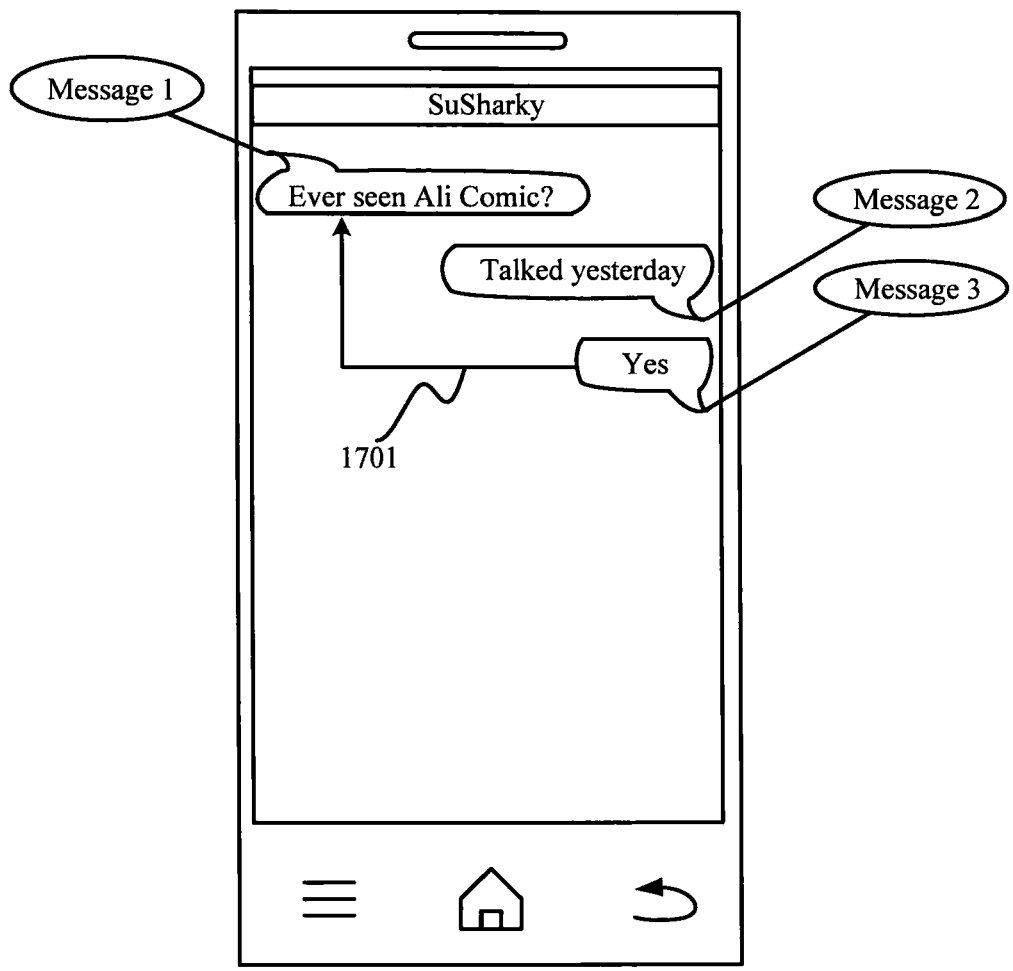
FIG. 17 is a schematic view of a message display window, according to an exemplary embodiment.

In addition, in exemplary embodiments, a preset operation performed on a message that has been sent out may also be detected, to display a reference mark in the message display window. For example, FIG. 16 is a schematic view of a sliding operation, represented by a line 1601, starting from Message 3 and finishing at Message 1 in the message display window. FIG. 17 is a schematic view of the message display window displaying that, after the sliding operation is detected, a reference mark 1701 is displayed between Message 3 and Message 1.

In the above embodiment, by displaying a reference mark between the messages, it is convenient for the user to understand content of the messages. For example, when different subject matters are discussed at the same time, a correlation between the messages may be found out by the user through the reference mark, which facilitates communication between users.

Figure 18:
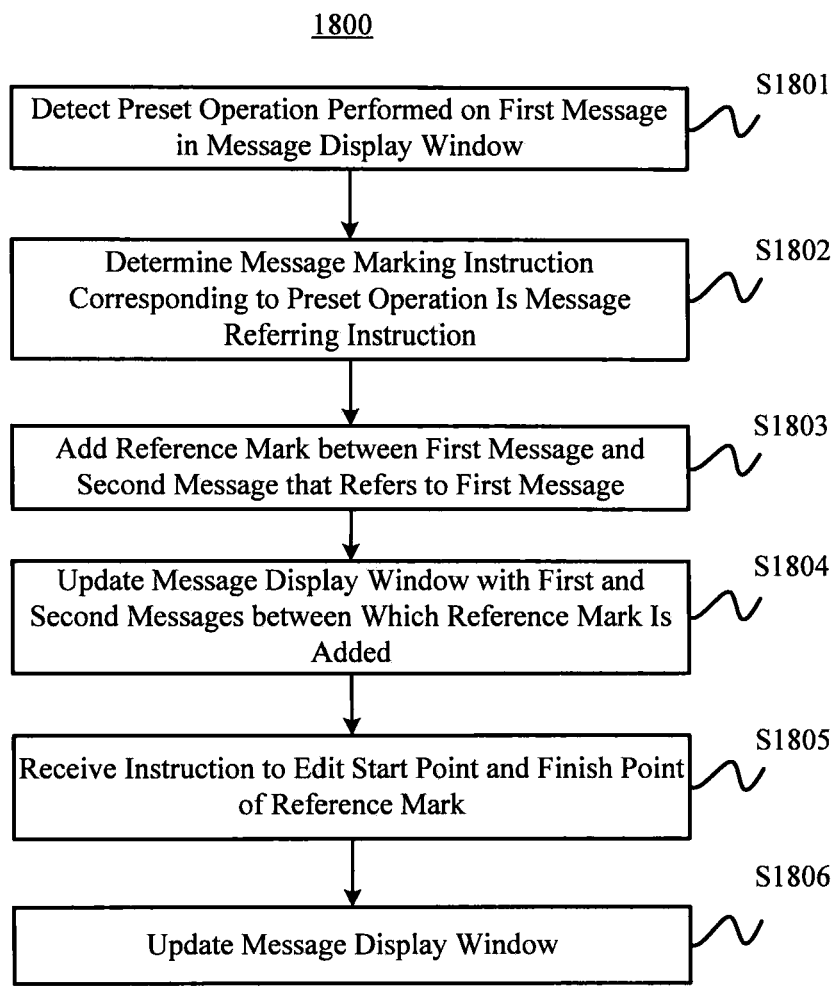
FIG. 18 is a flowchart of a method for editing a reference mark, according to an exemplary embodiment.

FIG. 18 is a flowchart of a method 1800 for editing a reference mark displayed on a device, according to an exemplary embodiment. Referring to FIG. 18, the method 1800 includes the following steps.

In step S1801, the device detects a preset operation performed on a first message in a message display window.

In step S1802, the device determines that a message marking instruction corresponding to the preset operation is a message referring instruction.

In step S1803, the device adds a reference mark between the first message and a second message that refers to the first message.

In step S1804, the device updates the message display window with the first and second messages between which the reference mark is added.

In step S1805, the device receives an instruction to edit a start point and a finish point of the reference mark displayed in the message display window.

In step S1806, the device updates the message display window by displaying the edited reference mark in the message display window.

In the above embodiment, by allowing an edit operation to the reference mark, it is convenient for the user to correlate the messages through the reference mark.

Figure 19:
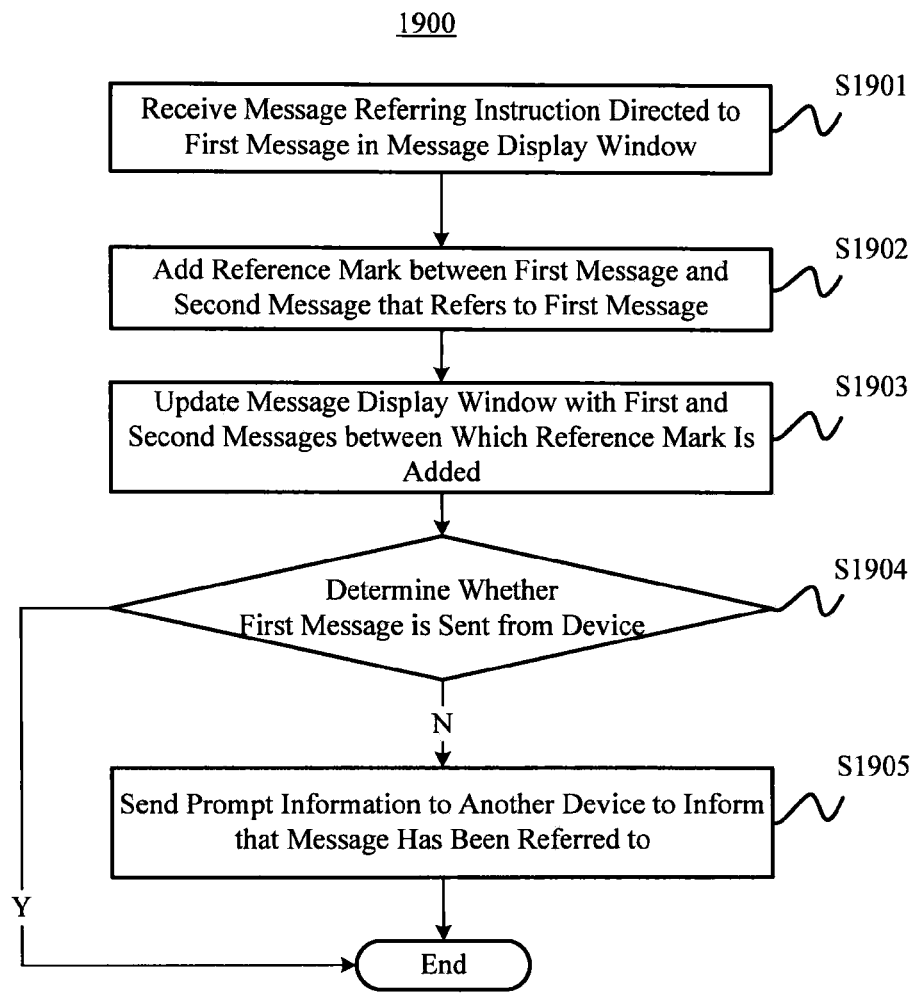
FIG. 19 is a flowchart of a method for displaying a message, according to an exemplary embodiment.

In one exemplary embodiment, when the message is not a message sent from the device, i.e., is a message received by the device, and the message marking instruction is the message referring instruction, the device sends prompt information to another device that sends the message, to inform that the message has been referred to. For example, FIG. 19 is a flowchart of a method 1900 for displaying a message, according to an exemplary embodiment. Referring to FIG. 19, the method 1900 includes the following steps.

In step S1901, the device receives a message referring instruction directed to a first message in a message display window.

In step S1902, the device adds a reference mark between the first message and a second message that refers to the first message.

In step S1903, the device updates the message display window with the first and second messages between which the reference mark is added.

In step S1904, the device determines whether the first message is a message sent from the device. If it is determined that the first message is a message sent from the device, the method 1900 ends; otherwise, step S1905 is performed.

In step S1905, the device sends prompt information to another device that sends the first message that the first message has been referred to.

In the above embodiment, by informing the sending device of the first message that the first message has been referred to, users of the devices may communicate promptly, which improves user experience.

Figure 20:
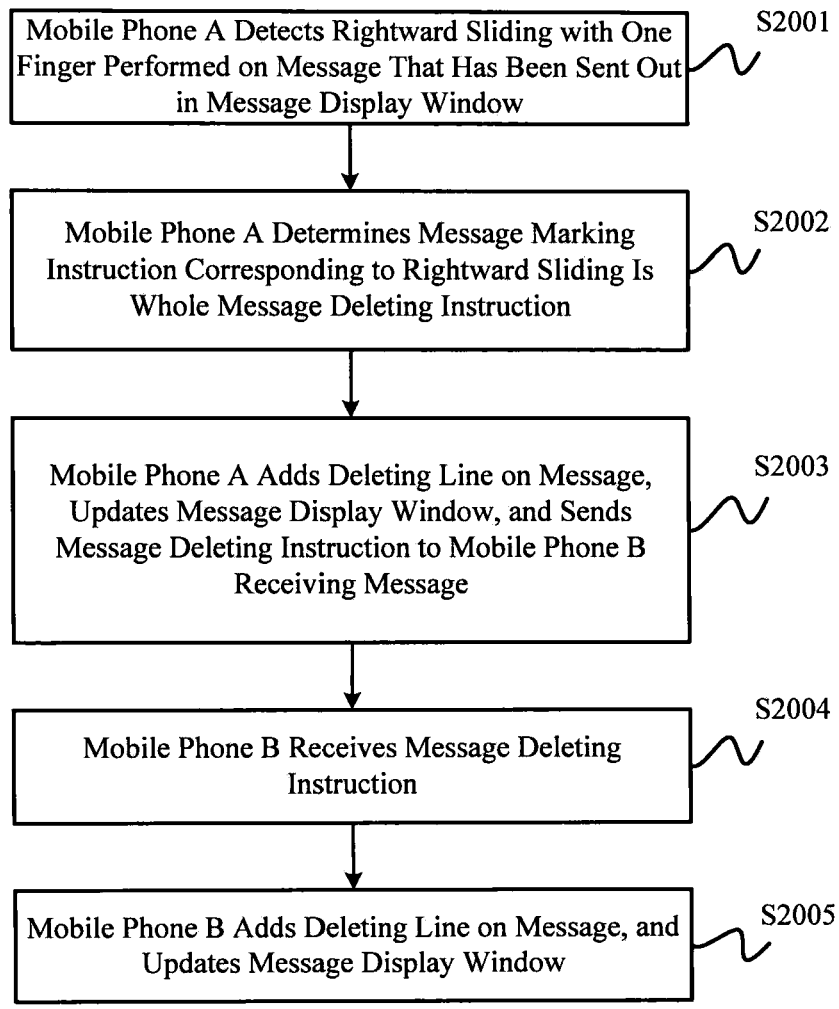
FIG. 20 is a flowchart of a method for displaying a message in a mobile phone A and a mobile phone B, according to an exemplary embodiment.

In exemplary embodiments, an added deleting line for a message is displayed in each of a message display window of a first device sending the message, such as a mobile phone A, and a message display window of a second device receiving the message, such as a mobile phone B. FIG. 20 is a flowchart of a method 2000 for displaying the message in the mobile phone A and the mobile phone B, according to an exemplary embodiment. Referring to FIG. 20, the method 2000 includes the following steps.

In step S2001, the mobile phone A detects a rightward sliding with one finger performed on the message that has been sent in the message display window.

In step S2002, the mobile phone A determines that a message marking instruction corresponding to the rightward sliding is a whole message deleting instruction.

In step S2003, the mobile phone A adds a deleting line on the message, updates the message display window with the message on which the deleting line is added, and sends the message deleting instruction to the mobile phone B receiving the message.

In step S2004, the mobile phone B receives the message deleting instruction directed to the message received from the mobile phone A.

In step S2005, the mobile phone B adds a deleting line on the message in the message display window according to the message deleting instruction received from the mobile phone A, and updates the message display window with the message on which the deleting line is added.

Figure 21:
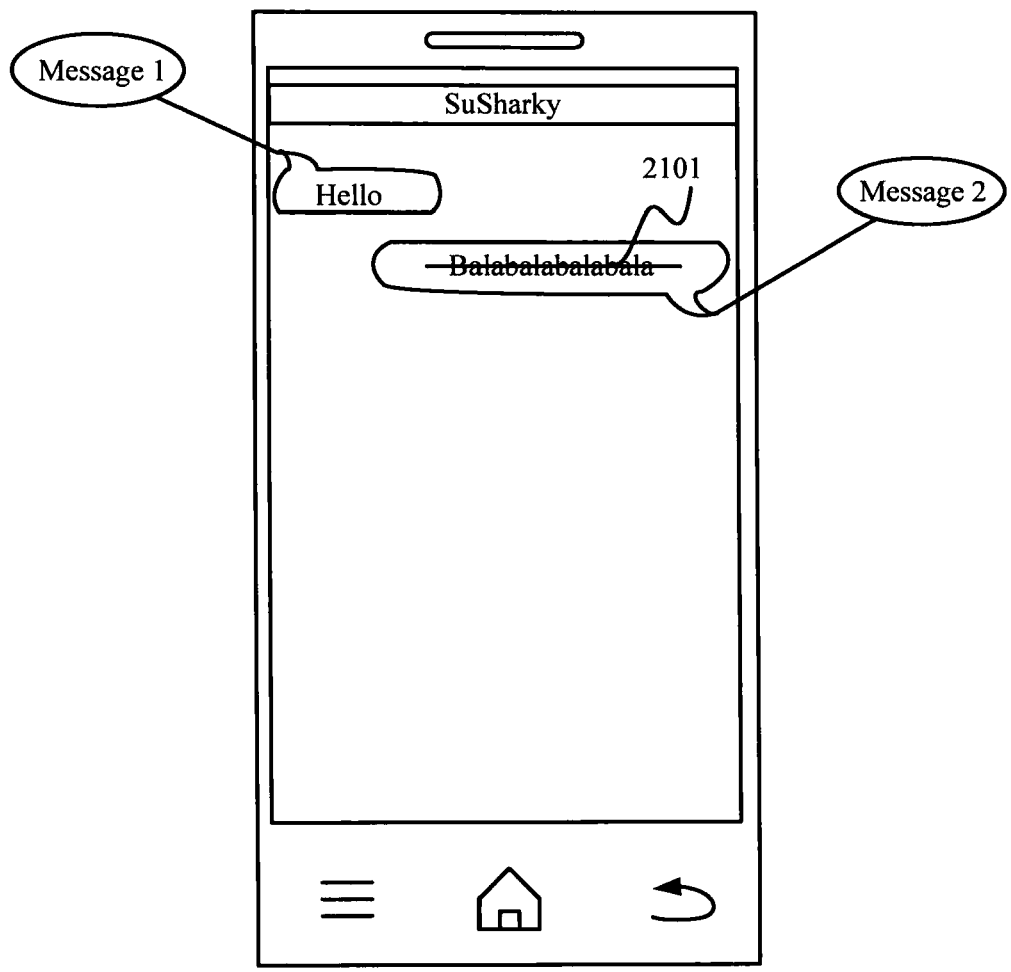
FIG. 21 is a schematic view of a message display window, according to an exemplary embodiment.

For example, FIG. 21 is a schematic view of the message display window of the mobile phone A displaying a deleting line 2101 being added on the message, such as Message 2.

Figure 22:
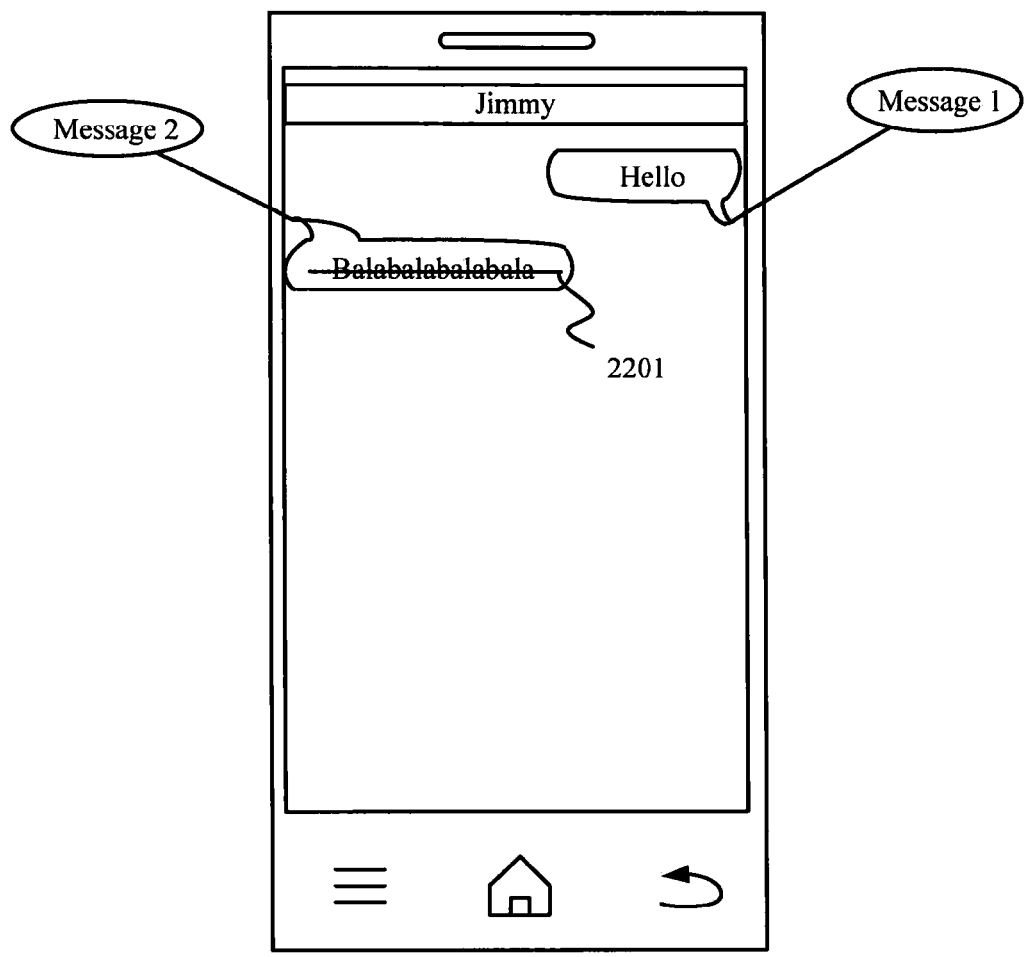
FIG. 22 is a schematic view of a message display window, according to an exemplary embodiment.

Also for example, FIG. 22 is a schematic view of the message display window of the mobile phone B displaying a deleting line 2201 being added on Message 2 received from the mobile phone A, after the message deleting instruction is received from the mobile phone A.

In the above embodiment, the mobile phone A and the mobile phone B are synchronized in displaying the message, such as Message 2.

Figure 23:
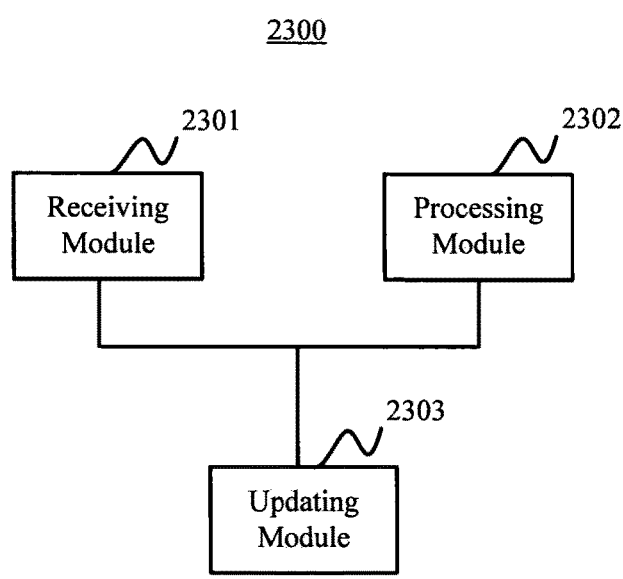
FIG. 23 is a block diagram of an apparatus for displaying a message, according to an exemplary embodiment.

FIG. 23 is a block diagram of an apparatus 2300 for displaying a message, according to an exemplary embodiment. Referring to FIG. 23, the apparatus 2300 includes a receiving module 2301 configured to receive a message marking instruction directed to a message in a message display window, a processing module 2302 configured to perform a corresponding process on the message according to the message marking instruction, and an updating module 2303 configured to update the message display window with the processed message. For example, the message marking instruction can be a message deleting instruction or a message referring instruction. Also for example, the message deleting instruction can be a whole message deleting instruction for deleting the whole message or a partial message deleting instruction for deleting a part of the message.

Figure 24:
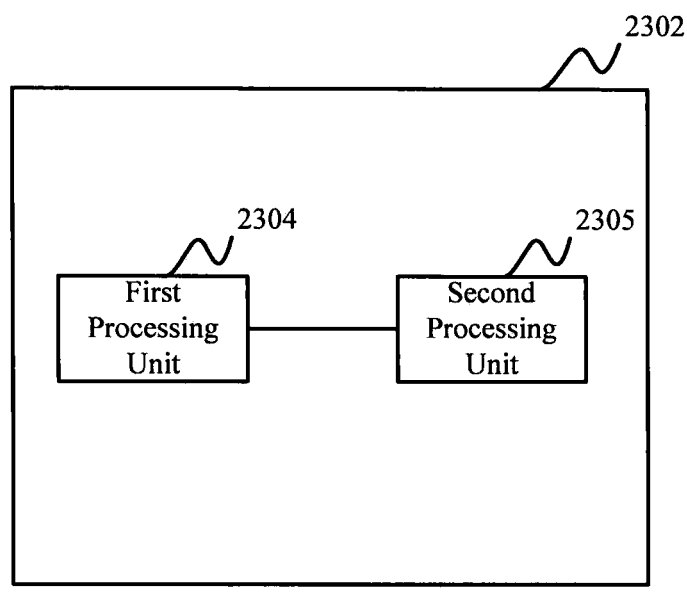
FIG. 24 is a block diagram of a processing module, according to an exemplary embodiment.

FIG. 24 is a block diagram of the processing module 2302 (FIG. 23), according to an exemplary embodiment. Referring to FIG. 24, the processing module 2302 includes a first processing unit 2304 configured to, when the message marking instruction is the whole message deleting instruction, delete the message or add a deleting line across the message, and a second processing unit 2305 configured to, when the message marking instruction is the partial message deleting instruction, delete selected characters in the message or add a deleting line across the selected characters in the message.

Figure 25:
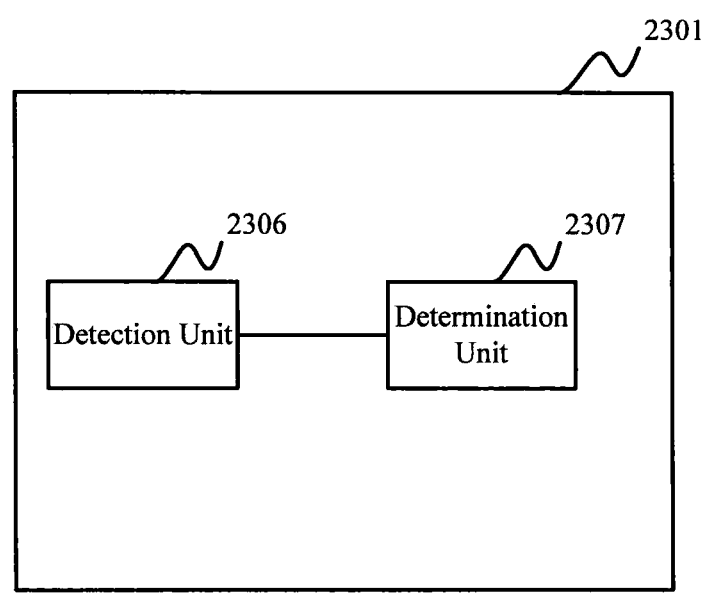
FIG. 25 is a block diagram of a receiving module, according to an exemplary embodiment.

FIG. 25 is a block diagram of the processing module 2302 (FIG. 23), according to an exemplary embodiment. Referring to FIG. 25, the receiving module 2301 includes a detection unit 2306 configured to detect a preset operation performed on the message in the message display window, and a determination unit 2307 configured to determine the message marking instruction that corresponds to the preset operation according to the detected preset operation performed on the message in the message display window.

Figure 26:
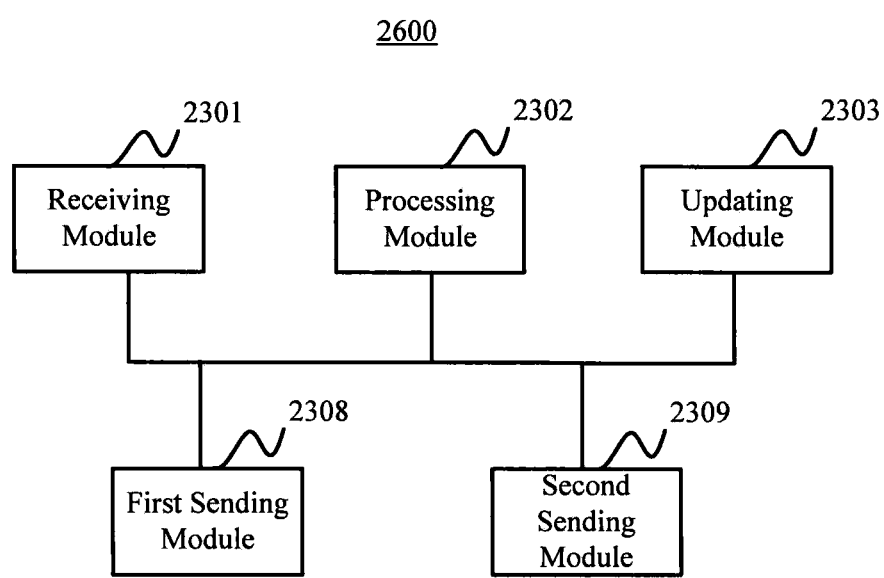
FIG. 26 is a block diagram of an apparatus for displaying a message, according to an exemplary embodiment.

FIG. 26 is a block diagram of an apparatus 2600 for displaying a message, according to an exemplary embodiment. Referring to FIG. 26, the apparatus 2600 includes a first sending module 2308 and a second sending module 2309, in addition to the receiving module 2301, the processing module 2302, and the updating module 2303 (FIG. 23).

The first sending module 2308 is configured to, when the message marking instruction is the message deleting instruction and the message is a message sent from a first device including the apparatus 2600, send the message marking instruction to a second device receiving the message. The second sending module 2309 is configured to, when the message marking instruction is the message referring instruction, send the message marking instruction to at least one of the second device receiving the message or a third device from which the message is received.

Figure 27:
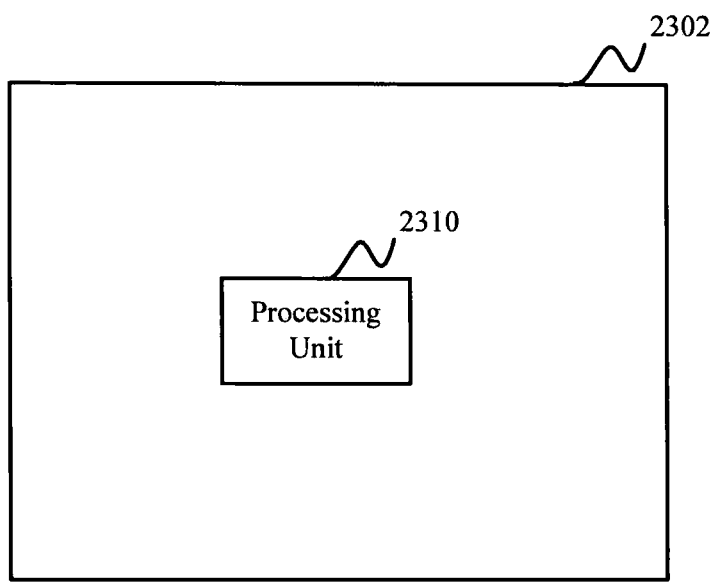
FIG. 27 is a block diagram of a processing module, according to an exemplary embodiment.

FIG. 27 is a block diagram of the processing module 2302 (FIG. 23), according to an exemplary embodiment. Referring to FIG. 27, the processing module 2302 includes a processing unit 2310 configured to, when the message marking instruction is the message referring instruction, add a reference mark between the message as a first message and a second message that refers to the first message. In one exemplary embodiment, an edit option is provided at a start point or a finish point of the reference mark, to modify or delete the reference mark.

Figure 28:
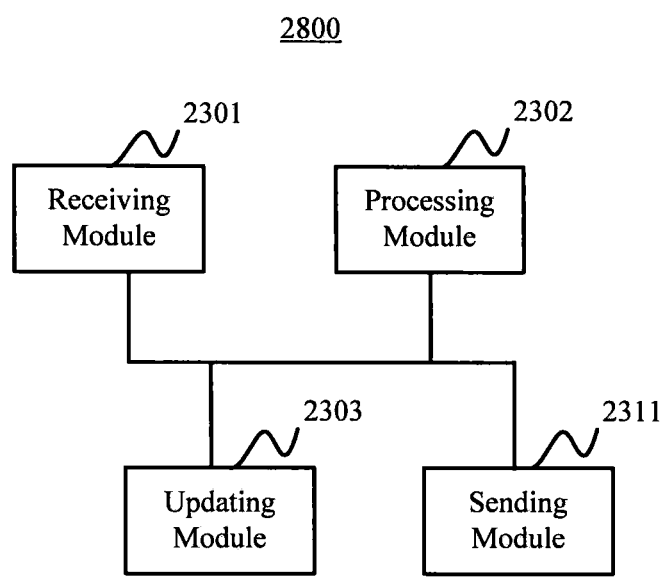
FIG. 28 is a block diagram of an apparatus for displaying a message, according to an exemplary embodiment.

FIG. 28 is a block diagram of an apparatus 2800 for displaying a message, according to an exemplary embodiment. Referring to FIG. 28, the apparatus 2800 includes a sending module 2311 in addition to the receiving module 2301, the processing module 2302, and the updating module 2303 (FIG. 23). The sending module 2311 is configured to, when the message is a received message and the message marking instruction is the message referring instruction, send prompt information to another device sending the message to inform that the message has been referred to.

Figure 29:
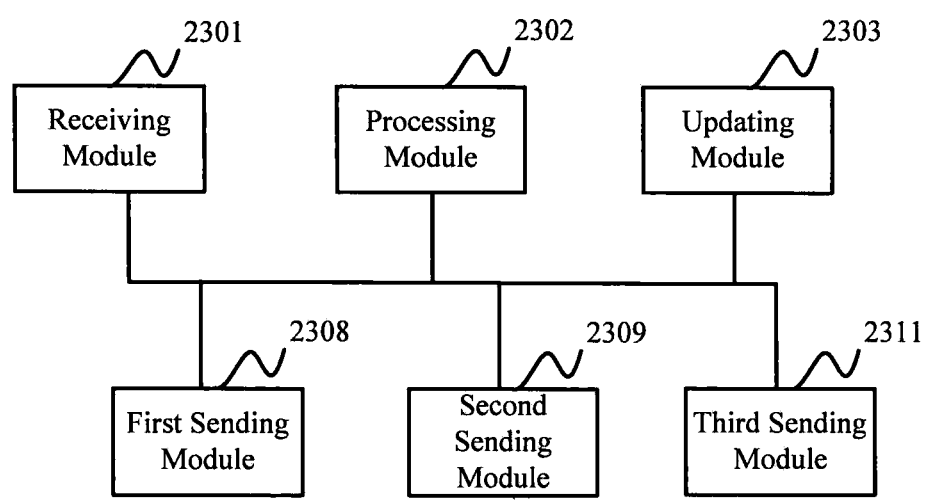
FIG. 29 is a block diagram of an apparatus for displaying a message, according to an exemplary embodiment.

FIG. 29 is a block diagram of an apparatus 2900 for displaying a message, according to an exemplary embodiment. Referring to FIG. 29, the apparatus 2900 includes the sending module 2311 as a third sending module, in addition to the receiving module 2301, the processing module 2302, the updating module 2303, the first sending module 2308, and the second sending module 2309 (FIG. 26).

Figure 30:
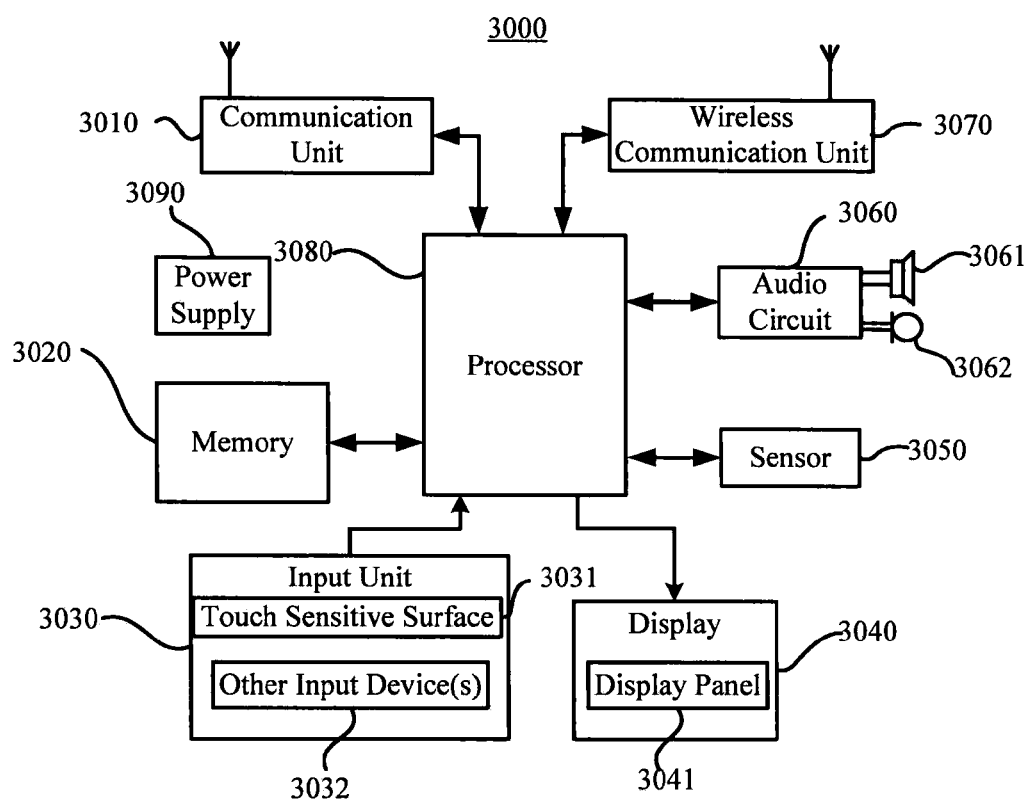
FIG. 30 is a block diagram of a device, according to an exemplary embodiment.

FIG. 30 is a block diagram of a device 3000, according to an exemplary embodiment. The device 3000 is configured to perform the above described methods for displaying a message. For example, the device 3000 may be a mobile phone, a tablet computer, a wearable mobile terminal such as a smart watch, and the like.

Referring to FIG. 30, the device 3000 may include one or more of a communication unit 3010, memory resources represented by a memory 3020, an input unit 3030, a display 3040, a sensor 3050, an audio circuit 3060, a wireless communication unit 3070, a processor 3080 including one or more processing cores, and a power supply 3090. It should be appreciated by those skilled in the art that the structure shown in FIG. 30 does not constitute a limitation to the device 3000, and the device 3000 may include more or less components than those shown in FIG. 30, or a combination of some of the components, or have different component arrangements.

The communication unit 3010 is configured to transmit and receive signals during transmitting and receiving information or a procedure of calling. The communication unit 3010 may be a network communication device such as a radio frequency (RF) circuit, a router, a modem, etc. For example, when the communication unit 3010 is an RF circuit, the communication unit 3010 receives downlink information from a base station, and then sends the downlink information to the processor 3080 to be processed. The communication unit 3010 also transmits uplink data to the base station. Generally, the RF circuit as the communication unit 3010 includes, but is not limited to, an antenna, at least one amplifier, a tuner, one or more oscillators, a subscriber identity module (SIM) card, a transceiver, a coupler, a low noise amplifier (LNA), a duplexer, etc. Furthermore, the communication unit 3010 may communicate with a network and other devices through wireless communication. The wireless communication may use any communication standards or protocols, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 3020 is configured to store software programs and modules. The processor 3080 performs various functional applications and data processing by running the software programs and modules stored in the memory 3020. The memory 3020 may mainly include a program storage area and a data storage area. The program storage area may store an operating system, and application programs required by at least one function (such as a function of sound playback, a function of image playback, etc.). The data storage area may store data created during operation of the device 3000 (such as audio data, phone book, etc.). In addition, the memory 3020 may include a high-speed random access memory and may also include a non-volatile memory. For example, the memory 3020 may include at least one disk storage device, a flash memory device, or other non-volatile solid-state memory devices. Accordingly, the memory 3020 may also include a memory controller to provide access to the memory 3020 performed by the processor 3080 and the input unit 3030.

The input unit 3030 is configured to receive input numbers or characters, and generate input signals from a keyboard, a mouse, a joystick, an optical device, or a trackball related to a user setting and functional control. The input unit 3030 may include a touch sensitive surface 3031 and one or more other input devices 3032. The touch sensitive surface 3031, also known as a touch screen or a track pad, may collect the user's touch operations on or near the touch sensitive surface 3031 (such as an operation performed by the user using any suitable object or accessory such as a finger, a touch pen and the like on or near the touch sensitive surface 3031), and drive a corresponding connected device according to a preset program. For example, the touch sensitive surface 3031 may include first and second parts, i.e., a touch detection device and a touch controller. The touch detection device detects a touching position of the user, detects a signal caused by the touch operation, and transmits the signal to the touch controller. The touch controller receives touch information from the touch detection device, transforms it into coordinates of the touch position, and sends the coordinates to the processor 3080. The touch controller may also receive a command from the processor 3080 and execute the command. In addition, the touch sensitive surface 3031 may be realized in various types, such as a resistive type, a capacitive type, an infrared type, a surface acoustic wave type, etc. In addition to the touch sensitive surface 3031, the input unit 3030 may also include one or more other input devices 3032. For example, the one or more other input devices 3032 may include, but are not limited to, one or more of a physical keyboard, functional keys (such as volume control keys, switch buttons, etc.), a trackball, a mouse, and a joystick.

The display 3040 is configured to display information input by the user or information provided for the user and various graphical user interfaces of the device 3000. These graphical user interfaces may consist of graphics, texts, icons, videos, and any combination thereof. The display 3040 may include a display panel 3041 configured with, e.g., a liquid crystal display (LCD), an organic light-emitting diode (OLED), etc. Further, the touch sensitive surface 3031 may cover the display panel 3041. When a touch operation on or near the touch sensitive surface 3031 is detected by the touch sensitive surface 3031, the touch operation is sent to the processor 3080 to determine a type of touch operation, and a corresponding visual output will be provided on the display panel 3041 by the processor 3080 according to the type of touch operation. Although in FIG. 30 the touch sensitive surface 3031 and the display panel 3041 are two separate components to realize input and output functions, in some embodiments, the touch sensitive surface 3031 and the display panel 3041 may be integrated to realize input and output functions.

The sensor 3050 may be a light sensor, a motion sensor, or any other sensors. For example, the light sensor may include an ambient light sensor and a proximity sensor. The ambient light sensor may adjust a brightness of the display panel 3041 according to a brightness of the ambient light. The proximity sensor may turn off the display panel 3041 and/or backlight when the device 3000 moves close to the user's ear. As an example of the motion sensor, a gravity acceleration sensor may detect an acceleration in each of one or more directions (such as along three axes), and may detect a magnitude and a direction of the gravity when it is stationary. The gravity acceleration sensor may be used in applications for identifying an attitude of the device 3000 (such as horizontal and vertical screen switching, related games, attitude calibration of a magnetometer), functions related to vibration recognizing (such as a pedometer, clicking), etc. The device 3000 may also be equipped with other sensors such as a gyroscope, a barometer, a hygrometer, a thermometer, an infrared sensor, etc.

The audio circuit 3060 is coupled to a speaker 3061 and a microphone 3062, and may provide an audio interface between the user and the device 3000. The audio circuit 3060 may transform received audio data into electrical signals which are transmitted to the speaker 3061 and transformed into sound signals to be output by the speaker 3061. On the other hand, the microphone 3062 transforms collected sound signals into electrical signals which are received and transformed into audio data by the audio circuit 3060. After being output to the processor 3080 to be processed, the audio data is transmitted to, for example, another device via the RF circuit as the communication unit 3010, or output to the memory 3020 for further processing. The audio circuit 3060 may also include an earplug jack to allow a communication between an external earphone and the device 3000.

The wireless communication unit 3070 may be a wireless fidelity (WiFi) module configured to provide the user with a wireless broadband Internet access. The WiFi module allows the user to send and receive emails, browse webpages, access streaming media, etc. Although FIG. 30 shows the wireless communication unit 3070, it should be appreciated that the wireless communication unit 3070 is not a necessary component of the device 3000, and may be omitted.

The processor 3080 is a control center of the device 3000 that connects various parts of the device 3000 through various interfaces and circuits, performs various functions and data processing by executing the software programs and/or modules stored in the memory 3020 and by invoking data stored in the memory 3020. The processor 3080 may include one or more processing cores. The processor 3080 may be integrated with an application processor that mainly processes the operating system, user interfaces and application programs, and a modem processor that mainly processes the wireless communication. In some embodiments, the modem processor may not be integrated into the processor 3080.

The power supply 3090 is configured to supply power to components of the device 3000. The power supply 3090 may be logically connected to the processor 3080 through a power supply management system, so as to achieve the functions such as charging, discharging, and power consumption managements, etc., through the power supply management system. The power supply 3090 may also include one or more components of a direct current (DC) or alternating current (AC) power, a recharge system, a power failure detection circuit, a power converter or an inverter, a power status indicator, etc.

Although not shown, the device 3000 may also include a camera, a Bluetooth module, etc.

In exemplary embodiments, there is also provided a non-transitory computer readable storage medium including instructions, such as included in the memory 3020, executable by the processor 3080 in the device 3000, for performing the above-described methods for displaying a message. For example, the storage medium may be a read-only memory, a magnetic disc, an optical disc, etc.

One of ordinary skill in the art will understand that the above described modules/units can each be implemented by hardware, or software, a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a first device to display a message sent from a second device, comprising:
   receiving, by the first device, a message marking instruction sent from the second device and directed to a message in a message display window, wherein the message marking instruction includes a message referring instruction;
   processing, by the first device, the message according to the message marking instruction, wherein the processing of the message comprises adding a reference mark based on the message referring instruction, the reference mark including a connection line connecting the message as a first message with a second message that refers to the first message; and
   updating, by the first device, the message display window with the processed message, wherein the updating of the message display window comprises displaying the reference mark in the message display window.

2. The method according to claim 1, wherein the receiving of the message marking instruction comprises:
   receiving a message deleting instruction.

3. The method according to claim 2, wherein the receiving of the message deleting instruction comprises:
   receiving at least one of a whole message deleting instruction for deleting the message or a partial message deleting instruction for deleting a part of the message.

4. The method according to claim 3, wherein:
   when the message marking instruction includes the whole message deleting instruction, the processing of the message comprises one of deleting the message or adding a deleting line across the message; and
   when the message marking instruction includes the partial message deleting instruction, the processing of the message comprises one of deleting selected characters in the message or adding a deleting line across the selected characters in the message.

5. The method according to claim 2, further comprising:
   detecting a preset operation performed on another message in the message display window; and
   determining another message marking instruction according to the detected preset operation.

6. The method according to claim 5, wherein when the another message is sent from the first device, and it is determined that the another message marking instruction is the message deleting instruction, the method further comprises:
sending, by the first device, the another message marking instruction to a third device receiving the another message.

7. The method according to claim 5, wherein when it is determined that the another message marking instruction is the message referring instruction, the method further comprises:
sending, by the first device, the another message marking instruction to at least one of a third device receiving the message or a fourth device sending the message.

8. The method according to claim 1, further comprising:
providing an edit option at at least one of a start point or a finish point of the reference mark, the edit option being configured to modify or delete the reference mark.

9. The method according to 1, further comprising:
sending, by the first device, prompt information to the second device to inform that the message has been referred to.

10. A device, comprising:
a processor; and
a memory for storing instructions executable by the processor,
wherein the processor is configured to:
receive a message marking instruction sent from another device and directed to a message, sent from the another device, in a message display window, wherein the message marking instruction includes a message referring instruction;
process the message according to the message marking instruction, wherein in processing of the message, the processor is further configured to add a reference mark based on the message referring instruction, the reference mark including a connection line connecting the message as a first message with a second message that refers to the first message; and
update the message display window with the processed message, wherein in updating the message display window, the processor is further configured to display the reference mark in the message display window.

11. The device according to claim 10, wherein the processor is further configured to:
receive a message deleting instruction.

12. The device according to claim 11, wherein the processor is further configured to:
receive, as the message deleting instruction, at least one of a whole message deleting instruction for deleting the message or a partial message deleting instruction for deleting a part of the message.

13. The device according to claim 12, wherein:
when the processor receives the whole message deleting instruction, the processor is further configured to perform one of deleting the message or adding a deleting line across the message; and
when the processor receives the partial message deleting instruction, the processor is further configured to perform one of deleting selected characters in the message or adding a deleting line across the selected characters in the message.

14. The device according to claim 11, wherein the processor is further configured to:
detect a preset operation performed on another message in the message display window; and
determine another message marking instruction according to the detected preset operation.

15. The device according to claim 14, wherein when the another message is sent from the device, and it is determined that the another message marking instruction is the message deleting instruction, the processor is further configured to:
send the message marking instruction to a third device receiving the another message.

16. The device according to claim 14, wherein when it is determined that the another message marking instruction is the message referring instruction, the processor is further configured to:
send the message marking instruction to at least one of a third device receiving the another message or a fourth device sending the another message.

17. The device according to claim 10, wherein the processor is further configured to:
provide an edit option at at least one of a start point or a finish point of the reference mark, the edit option being configured to modify or delete the reference mark.

18. A non-transitory computer-readable storage medium including instructions that, when executed by a processor of a first device, cause the first device to perform a method for displaying a message sent from a second device, the method comprising:
receiving a message marking instruction sent from a second device and directed to a message in a message display window, wherein the message marking instruction includes a message referring instruction;
processing the message according to the message marking instruction, wherein the processing of the message comprises adding a reference mark based on the message referring instruction, the reference mark including a connection line connecting the message as a first message with a second message that refers to the first message; and
updating the message display window with the processed message, wherein the updating of the message display window comprises displaying the reference mark in the message display window.

* * * * *